(12) United States Patent
Guo et al.

(10) Patent No.: US 11,812,402 B2
(45) Date of Patent: Nov. 7, 2023

(54) RADIO FRAME SENDING METHOD AND APPARATUS, AND RADIO FRAME RECEIVING METHOD AND APPARATUS

(71) Applicant: Huawei Technologies Co., Ltd., Shenzhen (CN)

(72) Inventors: Yuchen Guo, Shenzhen (CN); Yiqing Li, Shenzhen (CN); Ming Gan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/167,595

(22) Filed: Feb. 10, 2023

(65) Prior Publication Data

US 2023/0189195 A1  Jun. 15, 2023

Related U.S. Application Data

(63) Continuation of application No. PCT/CN2022/104842, filed on Jul. 11, 2022.

(30) Foreign Application Priority Data

Sep. 23, 2021 (CN) .......................... 202111116089.4

(51) Int. Cl.
  *H04W 60/06* (2009.01)
  *H04W 48/08* (2009.01)
  *H04W 40/24* (2009.01)

(52) U.S. Cl.
  CPC ......... *H04W 60/06* (2013.01); *H04W 40/248* (2013.01); *H04W 48/08* (2013.01)

(58) Field of Classification Search
  None
  See application file for complete search history.

(56) References Cited

U.S. PATENT DOCUMENTS

| 2021/0014911 A1 | 1/2021 | Patil et al. |
| 2021/0120586 A1 | 4/2021 | Cariou et al. |

(Continued)

FOREIGN PATENT DOCUMENTS

| CN | 112188644 A | 1/2021 |
| CN | 112821996 A | 5/2021 |

(Continued)

OTHER PUBLICATIONS

Chitrakar, R. et al, "Multi-link Element format", IEEE 802.11-20/0772r2, May 11, 2020, 10 pages.

(Continued)

*Primary Examiner* — Brian S Roberts
(74) *Attorney, Agent, or Firm* — Slater Matsil, LLP

(57) ABSTRACT

This application provides a radio frame sending method and apparatus, and a radio frame receiving method and apparatus. First information for identifying a first MLD in an MLE is included in a radio frame, so that a receiver of the radio frame obtains information of the first MLD from the MLE based on the first information after receiving the radio frame. In the method, a first AP generates the radio frame including the MLE, the MLE carries the information of the first MLD, the MLE includes the first information, and the first information identifies the first MLD; and the first AP sends the radio frame. This application is applied to a wireless local area network system supporting next-generation Wi-Fi protocols of IEEE 802.11ax, for example 802.11be (or referred to as the EHT protocol) and other 802.11 family of protocols.

20 Claims, 14 Drawing Sheets

(56) References Cited

U.S. PATENT DOCUMENTS

| | | | |
|---|---|---|---|
| 2021/0120599 A1 | 4/2021 | Cariou et al. | |
| 2021/0274574 A1* | 9/2021 | Ghosh | H04W 48/12 |
| 2021/0314846 A1* | 10/2021 | Chu | H04W 40/244 |
| 2022/0124857 A1* | 4/2022 | Patil | H04W 76/14 |
| 2023/0007572 A1* | 1/2023 | Patil | H04W 72/0446 |

FOREIGN PATENT DOCUMENTS

| | | |
|---|---|---|
| RU | 2639296 C1 | 12/2017 |
| WO | 2021177774 A2 | 9/2021 |

OTHER PUBLICATIONS

Gan, M. et al., "CC36 CR for ML Probe request", IEEE P802.11, Wireless LANs, 21/0301r53, Jul. 11, 2021, 7 pages.

IEEE P802.11ax/D6.0, "Draft Standard for Information technology—Tele-communications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, Nov. 2019, 780 pages.

Guo, J. et al, "CR for MLE Fragmentation", IEEE 802.11-21/1869r0, Nov. 11, 2021, 8 pages.

IEEE Std 802.11-2016, "IEEE Standard for Information technology—Telecommunications and information exchange between systems Local and metropolitan area networks—Specific requirements". Part 11: Wireless LAN Medium Access Control (MAC) and Physical Layer (PHY) Specifications, Approved Dec. 7, 2016, total 3534 pages.

* cited by examiner

RADIO FRAME SENDING METHOD AND APPARATUS, AND RADIO FRAME RECEIVING METHOD AND APPARATUS

CROSS-REFERENCE TO RELATED APPLICATIONS

This application is a continuation of International Application No. PCT/CN2022/104842, filed on Jul. 11, 2022, which claims priority to Chinese Patent Application No. 202111116089.4, filed on Sep. 23, 2021. The disclosures of the aforementioned applications are hereby incorporated by reference in their entireties.

TECHNICAL FIELD

This application relates to the field of wireless technologies, and in particular, to a radio frame sending method and apparatus, and a radio frame receiving method and apparatus.

BACKGROUND

With development of wireless technologies, more wireless devices support multi-link communication. For example, the devices support simultaneous communication on 2.4 gigahertz (GHz), 5 GHz, and 6 GHz frequency bands, or support communication on different channels of a same frequency band. This improves a communication rate between devices. Such devices are generally referred to as multi-link devices (MLD). The multi-link devices may be multi-link access point devices or multi-link station devices.

Currently, during communication between multi-link devices, one multi-link device may send a radio frame including a multi-link element (MLE) to another multi-link device. For example, a sender of a radio frame is an access point (AP) in a multi-link access point device. The AP may feed back a probe response frame in response to a probe request frame of a station (STA). By default, an MLE included in the probe response frame corresponds to the multi-link access point device with which the AP sending the probe response frame is affiliated, meaning that information carried in the MLE is station information of the multi-link access point device with which the AP sending the probe response frame is affiliated.

However, since the AP feeds back, only in the radio frame, information of the MLD in which the AP is located, communication efficiency is low. If the AP needs to feed back, in the radio frame, information of another MLD, for example, if the probe request frame of the STA requests information of an MLD that includes an AP corresponding to a nontransmitted basic service set identifier (nontransmitted BSSID) on a link in which the AP is located, how the AP feeds back the radio frame is a technical problem to be resolved urgently.

SUMMARY

This application provides a radio frame sending method and apparatus, and a radio frame receiving method and apparatus. First information for identifying a first MLD in an MLE is included in a radio frame, so that a receiver of the radio frame obtains information of the first MLD from the MLE based on the first information after receiving the radio frame.

A first aspect of this application provides a radio frame sending method, applied to WLAN communication. The method is performed by a first access point (AP), or the method is performed by a component (for example, a processor, a chip, or a chip system) of a first AP. In the first aspect and the possible implementations of the first aspect, an example in which the method is performed by the first AP is used for description. In the method, the first AP generates a radio frame including an MLE, where the MLE carries information of a first MLD, the MLE includes first information, and the first information identifies the first MLD; and the first AP sends the radio frame.

Based on the foregoing technical solution, in the WLAN communication process, the radio frame sent by the first AP includes the MLE for carrying the information of the first MLD, the MLE includes the first information for identifying the first MLD. Therefore, a receiver of the radio frame may obtain the information of the first MLD from the MLE based on the first information after receiving the radio frame. In other words, after receiving the radio frame, the receiver of the radio frame may determine, based on the first information, that the MLE corresponds to the first MLD. Therefore, the receiver of the radio frame may obtain, based on the MLE, information of stations on a plurality of links on which the first MLD is located, so that the receiver of the radio frame communicates with the first MLD.

In addition, in comparison with an implementation in which a field indirectly indicating an MLD corresponding to the MLE is carried in a location other than the MLE in the radio frame (for example, a basic service set identifier index (BSSID Index) is carried in a multiple BSSID-index element in a multiple BSSID element of the radio frame, to indirectly indicate an MLD with which an AP/STA corresponding to the MLE in the multiple BSSID element is affiliated, where the AP/STA is indicated by an SSID), in the foregoing implementation, because the MLE includes the first information (in other words, the first information is carried inside the MLE), the receiver of the radio frame may determine, based on the MLE, the MLD corresponding to the MLE, with no need to obtain an indirect indication from outside the MLE, so that the receiver of the radio frame obtains information of stations of the first MLD. This improves communication efficiency.

A second aspect of embodiments of this application provides a radio frame receiving method, applied to WLAN communication. The method is performed by a station (STA), or the method is performed by a component (for example, a processor, a chip, or a chip system) of a STA. In the second aspect and the possible implementations of the second aspect, an example in which the method is performed by the STA is used for description. In the method, the STA receives a radio frame from a first access point AP, where the radio frame includes a multi-link element MLE, the MLE carries information of a first multi-link device MLD, the MLE includes first information, and the first information identifies the first MLD; and the STA obtains the information of the first MLD from the MLE based on the first information.

Based on the foregoing technical solution, in the WLAN communication process, the STA serves as a receiver of a radio frame. The radio frame received by the STA from the first AP includes the MLE for carrying the information of the first MLD, and the MLE includes the first information for identifying the first MLD. Therefore, the receiver of the radio frame may obtain the information of the first MLD from the MLE based on the first information after receiving the radio frame. In other words, after receiving the radio frame, the receiver of the radio frame may determine, based on the first information, that the MLE corresponds to the first MLD. Therefore, the receiver of the radio frame may obtain, based on the MLE, information of stations on a plurality of links on which the first MLD is located, so that the receiver of the radio frame communicates with the first MLD.

In addition, in comparison with an implementation in which a field indirectly indicating an MLD corresponding to the MLE is carried in a location other than the MLE in the radio frame (for example, a basic service set identifier index (BSSID Index) is carried in a multiple BSSID-index element in a multiple BSSID element of the radio frame, to indirectly indicate an MLD with which an AP/STA corresponding to the MLE in the multiple BSSID element is affiliated, where the AP/STA is indicated by an SSID), in the foregoing implementation, because the MLE includes the first information (in other words, the first information is carried inside the MLE), the receiver of the radio frame may determine, based on the MLE, the MLD corresponding to the MLE, with no need to obtain an indirect indication from outside the MLE, so that the receiver of the radio frame obtains information of stations of the first MLD. This improves communication efficiency.

A third aspect of embodiments of this application provides a radio frame sending apparatus, applied to WLAN communication. The apparatus may be specifically a first AP, or a component (for example, a processor, a chip, or a chip system) of the first AP. The first AP includes a transceiver unit and a processing unit. The processing unit is configured to generate a radio frame, where the radio frame includes a multi-link element MLE, the MLE carries information of a first multi-link device MLD, the MLE includes first information, and the first information identifies the first MLD. The transceiver unit is configured to send the radio frame for the first AP.

Based on the foregoing technical solution, in the WLAN communication process, the radio frame sent by the transceiver unit includes the MLE for carrying the information of the first MLD, where the MLE includes the first information for identifying the first MLD. Therefore, a receiver of the radio frame may obtain the information of the first MLD from the MLE based on the first information after receiving the radio frame. In other words, after receiving the radio frame, the receiver of the radio frame may determine, based on the first information, that the MLE corresponds to the first MLD. Therefore, the receiver of the radio frame may obtain, based on the MLE, information of stations on a plurality of links on which the first MLD is located, so that the receiver of the radio frame communicates with the first MLD.

In addition, in comparison with an implementation in which a field indirectly indicating an MLD corresponding to the MLE is carried in a location other than the MLE in the radio frame (for example, a basic service set identifier index (BSSID Index) is carried in a multiple BSSID-index element in a multiple BSSID element of the radio frame, to indirectly indicate an MLD with which an AP/STA corresponding to the MLE in the multiple BSSID element is affiliated, where the AP/STA is indicated by an SSID), in the foregoing implementation, because the MLE includes the first information (in other words, the first information is carried inside the MLE), the receiver of the radio frame may determine, based on the MLE, the MLD corresponding to the MLE, with no need to obtain an indirect indication from outside the MLE, so that the receiver of the radio frame obtains information of stations of the first MLD. This improves communication efficiency.

A fourth aspect of embodiments of this application provides a radio frame receiving apparatus, used in WLAN communication. The apparatus may be specifically a STA, or a component (for example, a processor, a chip, or a chip system) of a STA. The apparatus includes a transceiver unit and a processing unit. The transceiver unit is configured to receive a radio frame from a first access point AP, where the radio frame includes a multi-link element MLE, the MLE carries information of a first multi-link device MLD, the MLE includes first information, and the first information identifies the first MLD. The processing unit is configured to obtain the information of the first MLD from the MLE based on the first information.

Based on the foregoing technical solution, in the WLAN communication process, the radio frame receiving apparatus serves as a receiver of the radio frame. The radio frame received by the transceiver unit in the receiving apparatus includes the MLE for carrying the information of the first MLD, and the MLE includes the first information for identifying the first MLD. Therefore, the receiver of the radio frame may obtain the information of the first MLD from the MLE based on the first information after receiving the radio frame. In other words, after receiving the radio frame, the receiver of the radio frame may determine, based on the first information, that the MLE corresponds to the first MLD. Therefore, the receiver of the radio frame may obtain, based on the MLE, information of stations on a plurality of links on which the first MLD is located, so that the receiver of the radio frame communicates with the first MLD.

In addition, in comparison with an implementation in which a field indirectly indicating an MLD corresponding to the MLE is carried in a location other than the MLE in the radio frame (for example, a basic service set identifier index (BSSID Index) is carried in a multiple BSSID-index element in a multiple BSSID element of the radio frame, to indirectly indicate an MLD with which an AP/STA corresponding to the MLE in the multiple BSSID element is affiliated, where the AP/STA is indicated by an SSID), in the foregoing implementation, because the MLE includes the first information (in other words, the first information is carried inside the MLE), the receiver of the radio frame may determine, based on the MLE, the MLD corresponding to the MLE, with no need to obtain an indirect indication from outside the MLE, so that the receiver of the radio frame obtains information of stations of the first MLD. This improves communication efficiency.

In a possible implementation of any one of the first aspect to the fourth aspect of embodiments of this application, the first AP is not affiliated with the first MLD.

Based on the foregoing technical solution, the MLE included in the radio frame is the information of the first MLD, and the first AP serves as a sender of the radio frame and is not affiliated with the first MLD. In other words, a device (which may be a single-link device or a multi-link access point device) in which the first AP is located is a device other than the first MLD. Therefore, this solution may be applied to a scenario in which the first AP sends information of another MLD (the first MLD). The receiver of the radio frame may also obtain, in a case in which the receiver of the radio frame is not associated with the first AP, the information of the first MLD based on the radio frame sent by the first AP.

In a possible implementation of any one of the first aspect to the fourth aspect of embodiments of this application, the first MLD is an MLD in which a second AP in a same BSSID set as the first AP is located. The radio frame further includes a multiple BSSID element, and the multiple BSSID element includes index information of a BSSID of the second AP, where a value of the index information of the BSSID of the second AP is the same as a value of the first information.

Optionally, the description that the first MLD is an MLD in which a second AP in a same BSSID set as the first AP is located may also be expressed as: The first MLD includes a second AP in a same multiple basic service set identifier BSSID set as the first AP.

Based on the foregoing technical solution, when the first AP is not affiliated with the first MLD, the first MLD may be specifically an MLD in which the second AP in a same BSSID set as the first AP is located, so that a multiple basic service set identifier element (Multiple BSSID element, or referred to as multiple BSSID element) in the radio frame sent by the first AP may carry information of the second AP. The multiple BSSID element may carry the index information of the BSSID of the second AP. Therefore, in the case in which the first MLD corresponding to the MLE in the radio frame includes the second AP, a value of the index information of the BSSID of the second AP in the multiple BSSID element is the same as the value of the first information in the MLE, to indicate that the information of the second AP in the multiple BSSID element and information carried in the MLE correspond to a same MLD (the first MLD).

In a possible implementation of any one of the first aspect to the fourth aspect of embodiments of this application, the MLE includes a first per-STA profile element, the first per-STA profile carries information of a third AP, and the third AP is affiliated with the first MLD. A value of a first element of the third AP is the same as a value of a first element of the second AP when the first per-STA profile element does not include the first element of the third AP.

Optionally, a non-inheritance element in the first per-STA profile element does not include the first element.

Optionally, the first per-STA profile element is a completely configured element. In other words, a value of a complete profile field in the first per-STA profile element is 1.

Optionally, the description that a value of a first element of the third AP is the same as a value of a first element of the second AP when the first per-STA profile element does not include the first element of the third AP may also be expressed as follows: When a first element of a station (the second AP) in a multiple BSSID element carried in a radio frame sent by a reporting station (the first AP) is not present in a complete profile element of a reported station (the third AP), it is considered that the first element is a portion of the complete profile element of the reported station, and a value of the first element in the multiple BSSID element is the same as a value of the first element in the complete profile element of the reported station, unless the complete profile element of the reported station carries a non-inheritance element and the first element is present in the non-inheritance element.

Based on the foregoing technical solution, the first MLD may further include the third AP different from the second AP, where the MLE includes the first per-STA profile element for carrying the information of the third AP. Because some information of different APs in the same MLD is the same, when the first per-STA profile element does not include the first element of the third AP, the value of the first element of the third AP is the same as the value of the first element of the second AP. Therefore, the first element of the third AP may inherit the first element of the second AP. This facilitates the receiver of the radio frame to determine the first element of the third AP based on the first element of the second AP carried in the multiple BSSID element.

In a possible implementation of any one of the first aspect to the fourth aspect of embodiments of this application, the MLE further includes a first field. A first value of the first field indicates that the value of the first element of the third AP is the same as the value of the first element of the second AP.

Based on the foregoing technical solution, the MLE may further carry the first field. The first value of the first field indicates that the value of the first element of the third AP is the same as the value of the first element of the second AP. In this way, the receiver of the radio frame determines, based on the first field in the MLE, that the first element of the third AP may inherit the first element of the second AP. In other words, the receiver of the radio frame determines, based on the first field in the MLE, that the value of the first element of the third AP is the same as the value of the first element of the second AP.

In a possible implementation of any one of the first aspect to the fourth aspect of embodiments of this application, the first field is located in a multi-link control (Multi-Link Control) field in the MLE, or the first field is located in a common information (Common Info) field in the MLE In a possible implementation of any one of the first aspect to the fourth aspect of embodiments of this application, the value of the first element of the second AP is the same as a value of a first element of the first AP.

Optionally, a first element of an AP in the first MLD is located in a frame body (Frame body) of the radio frame.

Optionally, a non-inheritance element in an element of the second AP in the multiple BSSID element does not include the first element.

Optionally, the element of the second AP in the multiple BSSID element is a completely configured element. In other words, a value of a complete profile field in the element of the second AP in the multiple BSSID element is 1.

Optionally, the description that the value of the first element of the second AP is the same as a value of a first element of the first AP may also be expressed as follows: When the element of the second AP in the multiple BSSID element does not include the first element of the second AP, the value of the first element of the second AP is the same as the value of the first element of the first AP. Alternatively, the description may be expressed as: when a first element carried (information indicating the first element of the first AP) in a radio frame sent by a reporting station (the first AP) is not present in the complete profile element of the second AP in the multiple BSSID element, it is considered that the first element is a portion of the complete profile element of the second AP in the multiple BSSID element, and the value of the first element in the complete profile element of the second AP in the multiple BSSID element is the same as the value of the first element in the radio frame, unless the complete profile element of the second AP in the multiple BSSID element carries a non-inheritance element, and the first element is present in the non-inheritance element.

Based on the foregoing technical solution, because some information of different APs in a same multiple BSSID set is the same, when the multiple BSSID element does not include the first element of the second AP, the value of the first element of the second AP is the same as the value of the first element of the first AP. Therefore, the first element of the second AP may inherit the first element of the first AP. This facilitates the receiver of the radio frame to determine the first element of the third AP based on the first element of the first AP carried in the radio frame.

In a possible implementation of any one of the first aspect to the fourth aspect of embodiments of this application, the first MLD includes a fourth AP. The radio frame further includes a reduced neighbor report (RNR) element, the RNR element includes information of the fourth AP and includes second information for identifying the first MLD. The value of the first information is the same as a value of the second information.

Based on the foregoing technical solution, the radio frame further includes the RNR element for reporting the information of the fourth AP, where the RNR element includes the second information for identifying the first MLD with which the fourth AP is affiliated, and the value of the first information is the same as the value of the second information. Therefore, in the case in which the first MLD corresponding to the MLE in the radio frame includes the fourth AP, the value of the second information in the RNR element for identifying the first MLD with which the fourth AP is affiliated is the same as the value of the first information in the MLE, to indicate that the information of the fourth AP in the RNR element and information carried in the MLE correspond to a same MLD (the first MLD).

In a possible implementation of any one of the first aspect to the fourth aspect of embodiments of this application, the MLE includes a second per-STA profile element, and the second per-STA profile element carries information of an AP in the first MLD. A value of a first element of the AP in the first MLD is the same as the value of the first element of the first AP when the second per-STA profile element does not include the first element of the AP in the first MLD.

Optionally, the first MLD may include at least one of the following AP: the second AP, the third AP, and the fourth AP; or the first MLD may include another AP (for example, another neighboring AP); or the first MLD may include an AP corresponding to any per-STA profile element carried in the MLE. This is not limited herein.

Optionally, the first element of the AP in the first MLD is located in the frame body of the radio frame.

Optionally, a non-inheritance element in the second per-STA profile element does not include the first element.

Optionally, the second per-STA profile element is a completely configured element. In other words, a value of a complete profile field in the second per-STA profile element is 1.

Optionally, the description that a value of a first element of the AP in the first MLD is the same as the value of the first element of the first AP when the second per-STA profile element does not include the first element of the AP in the first MLD may also be expressed as follows: When a first element carried (information indicating the first element of the first AP) in a radio frame sent by a reporting station (the first AP) is not present in a complete profile element of a reported station (the AP in the first MLD), it is considered that the first element is a portion of the complete profile element of the reported station, and a value of the first element in the radio frame is the same as a value of the first element in the complete profile element of the reported station, unless the complete profile element of the reported station carries a non-inheritance element and the first element is present in the non-inheritance element.

Based on the foregoing technical solution, the MLE includes the second per-STA profile element for carrying information of the AP in the first MLD. Because some information of the first MLD and the first AP (or an MLD in which the first AP is located) is the same, when the second per-STA profile element does not include a first element of an AP in the first MLD, the value of the first element of the AP in the first MLD is the same as the value of the first element of the first AP. Therefore, the first element of the AP in the first MLD may inherit the first element of the first AP. This facilitates the receiver of the radio frame to determine the first element of the AP in the first MLD based on the first element of the first AP carried in the radio frame.

In a possible implementation of any one of the first aspect to the fourth aspect of embodiments of this application, the MLE further includes the first field. A second value of the first field indicates that the value of the first element of the AP in the first MLD is the same as the value of the first element of the first AP.

Based on the foregoing technical solution, the MLE may further carry the first field. The second value of the first field indicates that the value of the first element of the AP in the first MLD is the same as the value of the first element of the first AP. In this way, the receiver of the radio frame determines, based on the first field in the MLE, that the first element of the AP in the first MLD may inherit the first element of the first AP. In other words, the receiver of the radio frame determines, based on the first field in the MLE, that the value of the first element of the AP in the first MLD is the same as the value of the first element of the first AP.

In a possible implementation of any one of the first aspect to the fourth aspect of embodiments of this application, the first AP is affiliated with the first MLD.

Based on the foregoing technical solution, the MLE included in the radio frame is the information of the first MLD, and the first AP serves as a sender of the radio frame and is affiliated with the first MLD. In other words, the first AP is one of APs in the first MLD. Therefore, this solution may be applied to a scenario in which the first AP sends the information of the MLD (the first MLD) in which the first AP is located. The receiver of the radio frame may obtain, in a case in which the receiver of the radio frame is associated with the first AP, the information of the first MLD based on the radio frame sent by the first AP.

In addition, in comparison with an implementation in which the MLE in the radio frame carries, by default, the information of the MLD in which the sender of the radio frame is located and does not carry indication information, in this solution, because the first information in the MLE indicates the MLD corresponding to the MLE, the receiver of the radio frame may determine, based on the first information, that the MLD corresponding to the first MLE is the MLD in which the first AP is located. In addition, the solution may also be used in a scenario in which the radio frame carries MLEs corresponding to MLDs other than the radio frame sender. In other words, based on the setting of the first information, the solution is applicable to a scenario in which the radio frame carries a plurality of MLEs corresponding to a plurality of MLDs (including the MLD in which the radio frame sender is located, that is, the first MLD).

In a possible implementation of any one of the first aspect to the fourth aspect of embodiments of this application, the MLE includes the common information field, and the first information is located in the common information field.

In a possible implementation of any one of the first aspect to the fourth aspect of embodiments of this application, the first information is a multi-link device identifier (MLD ID) field.

Optionally, the first information may alternatively be another field name, for example, a multi-link identifier, a multi-link device index, or a multi-link index.

In a possible implementation of any one of the first aspect to the fourth aspect of embodiments of this application, the radio frame further includes a fragment element adjacent to the MLE. The MLE carries a first portion of the information of the first MLD, and the fragment element carries a second portion of the information of the first MLD.

Based on the foregoing technical solution, in the WLAN communication process, a length of information that can be carried by an MLE may be fixed (for example, 255 octets). Therefore, a case in which one MLE is insufficient to carry the information of the first MLD may occur first due to the length limitation. In this case, different portions of the information of the first MLD may be separately carried in the MLE and one or more fragment elements adjacent to the MLE, so that the information of the first MLD is completely transmitted.

In addition, in comparison with an implementation in which different portions of information of the MLD are carried in a plurality of non-adjacent subelements, that is, carried in locations other than the MLE in the radio frame (for example, information of a same MLD is carried in different subelements of data portions of a plurality of nontransmitted BSSID profile subelements in the multiple BSSID element of the radio frame), in the foregoing solution, because the MLE and one or more pieces of fragment information are adjacent in the radio frame, the receiver of the radio frame may obtain the information of the same MLD from the MLE and the one or more pieces of fragment information adjacent to the MLE, instead of separately reading information from a plurality of non-adjacent subelements, so that the receiver of the radio frame obtains information of stations of the first MLD. This improves communication efficiency.

Optionally, a quantity of information elements included in the fragment element is 1, the fragment element includes a length field, and a value of the length field is less than or equal to 255.

Optionally, the fragment element includes n information elements, a value of a length field of each information element except for the last information element in the n information elements is 255, where n is an integer greater than 1.

In a possible implementation of any one of the first aspect to the fourth aspect of embodiments of this application, the radio frame is a multi-link probe response (ML Probe Response) frame.

Based on the foregoing technical solution, the communication method may be applied to a multi-link probe process. After receiving a multi-link probe request (ML Probe Request) frame, the first AP may generate and send the multi-link probe response frame, to execute the multi-link probe process.

A fifth aspect of embodiments of this application provides a communication apparatus, including at least one processor. The at least one processor is coupled to a memory, the memory is configured to store a program or instructions. The at least one processor is configured to execute the program or the instructions, so that the apparatus implements the method according to any one of the first aspect or the possible implementations of the first aspect, or the apparatus implements the method according to any one of the second aspect or the possible implementations of the second aspect.

A sixth aspect of embodiments of this application provides a computer-readable storage medium storing one or more computer-executable instructions. When the computer-executable instructions are executed by a processor, the processor performs the method according to any one of the first aspect or the possible implementations of the first aspect, or the processor performs the method according to any one of the second aspect or the possible implementations of the second aspect.

A seventh aspect of embodiments of this application provides a computer program product (or referred to as a computer program) storing one or more computer instructions. When the computer program product is executed by a processor, the processor performs the method according to any one of the first aspect or the possible implementations of the first aspect, or the processor performs the method according to any one of the second aspect or the possible implementations of the second aspect.

An eighth aspect of embodiments of this application provides a chip system. The chip system includes at least one processor, configured to support a communication apparatus in implementing functions in any one of the first aspect or the possible implementations of the first aspect, or configured to support a communication apparatus in implementing functions in any one of the second aspect or the possible implementations of the second aspect.

In a possible design, the chip system further includes a memory. The memory is configured to store program instructions and data that are necessary for the communication apparatus. The chip system may include a chip, or may include a chip and another discrete component. Optionally, the chip system further includes an interface circuit, and the interface circuit provides program instructions and/or data for the at least one processor.

A ninth aspect of embodiments of this application provides a communication system. The communication system includes the communication apparatus in the third aspect and the communication apparatus in the fourth aspect, and/or the communication system includes the communication apparatus in the fifth aspect.

For technical effects brought by any design in the fifth aspect to the ninth aspect, refer to the technical effects brought by different implementations in the first aspect to the fourth aspect. Details are not described herein again.

It can be learned from the foregoing technical solutions that, in the WLAN communication process, the radio frame sent by the first AP includes the MLE for carrying the information of the first MLD, where the MLE includes the first information for identifying the first MLD. Therefore, the receiver of the radio frame may obtain the information of the first MLD from the MLE based on the first information after receiving the radio frame. In other words, after receiving the radio frame, the receiver of the radio frame may determine, based on the first information, that the MLE corresponds to the first MLD. Therefore, the receiver of the radio frame may obtain, based on the MLE, information of stations on a plurality of links on which the first MLD is located, so that the receiver of the radio frame communicates with the first MLD.

In addition, in comparison with an implementation in which a field indirectly indicating an MLD corresponding to the MLE is carried in a location other than the MLE in the radio frame (for example, a basic service set identifier index (BSSID Index) is carried in a multiple BSSID-index element in a multiple BSSID element of the radio frame, to indirectly indicate an MLD with which an AP/STA corresponding to the MLE in the multiple BSSID element is affiliated, where the AP/STA is indicated by an SSID), in the foregoing implementation, because the MLE includes the first information (in other words, the first information is carried inside the MLE), the receiver of the radio frame may determine, based on the MLE, the MLD corresponding to the MLE, with no need to obtain an indirect indication from outside the MLE, so that the receiver of the radio frame obtains information of stations of the first MLD. This improves communication efficiency.

DETAILED DESCRIPTION OF ILLUSTRATIVE EMBODIMENTS

Figure 1:
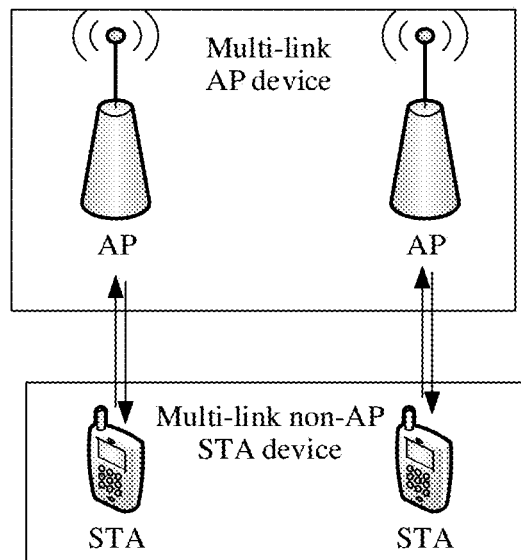
FIG. 1 is a schematic diagram of a communication system according to an embodiment of this application.

For identical or similar parts in embodiments in this application, mutual reference may be made between the embodiments. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in different embodiments and implementations/implementation methods in embodiments may be combined to form a new embodiment, implementation, or implementation method according to an internal logical relationship thereof. The following descriptions of implementations of this application do not constitute any limitation on the protection scope of this application.

It may be understood that, in some scenarios, some optional features in embodiments of this application may be independently implemented without depending on another feature, for example, a solution on which the optional features are currently based, to resolve a corresponding technical problem and achieve corresponding effects. Alternatively, in some scenarios, the optional features are combined with other features as required. Correspondingly, apparatuses provided in embodiments of this application may also correspondingly implement these features or functions. Details are not described herein.

In description of this application, the term "a plurality of" means two or more than two unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the expression such as "example" or "for example" is used to represent giving an example, an illustration, or description. Any embodiment or implementation described as an "example" or "for example" in embodiments of this application should not be explained as being more preferred or having more advantages than another embodiment or implementation. Exactly, use of the expressions such as "example" and "for example" is intended to present a relative concept in a specific manner for ease of understanding.

For ease of understanding the method provided in embodiments of this application, the following describes a system architecture of the method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions provided in this application are applicable to a WLAN scenario, for example, are applicable to standards of an IEEE 802.11 system, for example, 802.11a/b/g, 802.11n, 802.11ac, 802.11ax, or a next generation of 802.11ax, for example, 802.11be or a further next generation standard.

Although embodiments of this application are mainly described by using an example of a deployed WLAN network, especially a network applying the standards of an IEEE 802.11 system, a person skilled in the art easily understands that aspects of this application may be extended to other networks using various standards or protocols, for example, Bluetooth (Bluetooth), high-performance wireless LAN (high performance radio LAN, HIPERLAN) (which is a wireless standard similar to the IEEE 802.11 standard, and mainly used in Europe), a wide area network (WAN), a personal area network (PAN), or other networks that are known or developed in future. Therefore, the various aspects provided in this application are applicable to any suitable wireless network regardless of coverage and wireless access protocols.

Alternatively, embodiments of this application may be applied to a wireless local area network system, for example, an internet of things (IoT) or a vehicle-to-everything (Vehicle to X, V2X) network. Certainly, embodiments of this application are applicable to other possible communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) communication system, and a future sixth generation (6th generation, 6G) communication system.

The foregoing communication systems used in this application are merely examples for description, and are not limited thereto. A general description is provided herein. Details are not described below again.

A radio frame sending method and apparatus and a radio frame receiving method and apparatus provided in embodiments of this application may be applied to a wireless communication system. The wireless communication system may be a wireless local area network (WLAN) or a cellular network. The method may be implemented by a communication device in the wireless communication system or a chip or a processor in the communication device. The communication device may be a wireless communication device capable of parallel transmission over a plurality of links. For example, the communication device is referred to as a multi-link device (MLD) or a multi-band device (device). In comparison with a device that supports transmission over only a single-link, the multi-link device has higher transmission efficiency and a higher throughput.

FIG. 1 is a schematic diagram of a communication system according to an embodiment of this application.

As shown in FIG. 1, the communication system mainly includes at least one multi-link access point device (Multi-link AP device) and at least one multi-link non-access point station device (Multi-link non-AP STA device) (multi-link station device for short). The multi-link access point device and the multi-link station device may be collectively referred to as multi-link devices. The following provides descriptions about the multi-link device.

The multi-link device includes one or more affiliated stations (affiliated STAs). The affiliated STA is a logical station and may operate over a single link. The affiliated station may be an access point (AP) or a non-access point station (non-AP STA). For ease of description, in this application, a multi-link device whose affiliated station is an AP may be referred to as a multi-link AP, a multi-link AP device or an AP multi-link device; and a multi-link device (multi-link non-AP STA device) whose affiliated station is a non-AP STA may be referred to as a multi-link STA, a multi-link STA device, or a STA multi-link device. For ease of description, "a multi-link device includes an affiliated STA" is also briefly described as "a multi-link device includes a STA" in embodiments of this application.

It should be noted that a multi-link device includes a plurality of logical stations, and each of the logical stations operates on a single link, but a plurality of logical stations are allowed to operate on a same link. A link identifier mentioned below represents one station operating on one link. In other words, if there is more than one station on one link, more than one link identifier is used to represent the more than one station. A link mentioned below sometimes also represents a station operating on the link.

During data transmission between a multi-link AP device and a multi-link STA, a link identifier may be used to identify one link or a station on one link. Before communication, the multi-link AP device and the multi-link STA device may negotiate or communicate with each other about a correspondence between a link identifier and a link or a station on a link. Therefore, during data transmission, a link identifier is carried to indicate a link or a station on a link, instead of transmitting a large amount of signaling information for indication. This reduces signaling overheads and improves transmission efficiency.

In an example, a multi-link AP device may send a management frame, for example, a beacon frame, during establishment of a basic service set (BSS), where the management frame carries an element including a plurality of link identifier information fields, and a correspondence between a link identifier and a station operating on a link may be established in each of the link identifier information fields. Each of the link identifier information fields includes a link identifier, and further includes one or more of the following: a medium access control (MAC) address, an operating class, and a channel number, where one or more of the MAC address, the operating class, and the channel number may indicate a link. In another example, in a multi-link association establishment process, the multi-link AP device and the multi-link station device negotiate a plurality of link identifier information fields. In subsequent communication, the multi-link AP device or the multi-link station device may represent a station in the multi-link device using a link identifier, and the link identifier may further represent one or more attributes of a MAC address of the station, an operating class, and a channel number. The MAC address may alternatively be replaced with an association identifier of the multi-link AP device associated with the station.

If a plurality of stations operate on one link, the link identifier (which is a numeric ID) represents an operating class and a channel number corresponding to the link, and also represents an identifier of a station operating on the link, for example, a MAC address or an association identifier (AID) of the station.

The multi-link device may implement wireless communication following the 802.11 family of standards. For example, a station supporting extremely high throughput (EHT), or a station supporting 802.11be or a station supporting a standard as well as 802.11be implements communication with another device. Certainly, the another device may be or may not be a multi-link device.

The non-AP MLD in this application may be a wireless communication chip, a wireless sensor, or a wireless communication terminal. For example, examples of the non-AP MLD may be a user terminal, a user apparatus, an access apparatus, a subscriber station, a subscriber unit, a mobile station, a user agent, and user equipment capable of Wi-Fi communication. The user terminal may be any one of various devices capable of wireless communication, such as a handheld device, a vehicle-mounted device, a wearable device, an Internet of Things (IoT) device, a computing device, another processing device connected to a wireless modem, and user equipment (UE) of various forms, a mobile station (MS), a terminal, terminal equipment, a portable communication device, a handheld device, a portable computing device, an entertainment device, a game device or system, a global positioning system device, any other suitable device configured for network communication via a wireless medium, and the like. In addition, the non-AP MLD may support the 802.11be standard or a next-generation WLAN standard of 802.11be. The non-AP MLD may also support a plurality of WLAN standards such as 802.11ax, 802.11ac, 802.11n, 802.11g, 802.11b, and 802.11a.

The AP MLD in embodiments of this application may be an apparatus that is deployed in a wireless communication network to provide a wireless communication function for a non-AP associated with the AP MLD. The AP MLD is mainly deployed at home, inside a building, and in a campus, with a typical coverage radius of tens of meters to hundreds of meters. Certainly, the AP MLD may alternatively be deployed outdoors. The AP MLD, equivalent to a bridge connecting a wired network and a wireless network, is mainly configured to connect wireless network clients together, and then connect the wireless network to the Ethernet. Specifically, the AP MLD may be a communication device with a Wi-Fi chip, such as a base station, a router, a gateway, a repeater, a communication server, a switch, or a bridge. The base station may be in various forms such as a macro base station, a micro base station, a relay station, and the like. In addition, the AP MLD may support the 802.11be standard or a next-generation WLAN standard of 802.11be. The AP MLD may also support WLAN standards such as 802.11ax, 802.11ac, 802.11n, 802.11g, 802.11b, and 802.11a.

As described above, the multi-link access point device and the multi-link station device may communicate with each other using a plurality of radio frames, for example, an association request frame, a reassociation request frame, an association response frame, a reassociation response frame, and a probe response frame. Different radio frames may carry a multi-link element (MLE) for carrying information of a station of a multi-link device. The MLE may also be referred to as a multi-link information unit.

Figure 2:
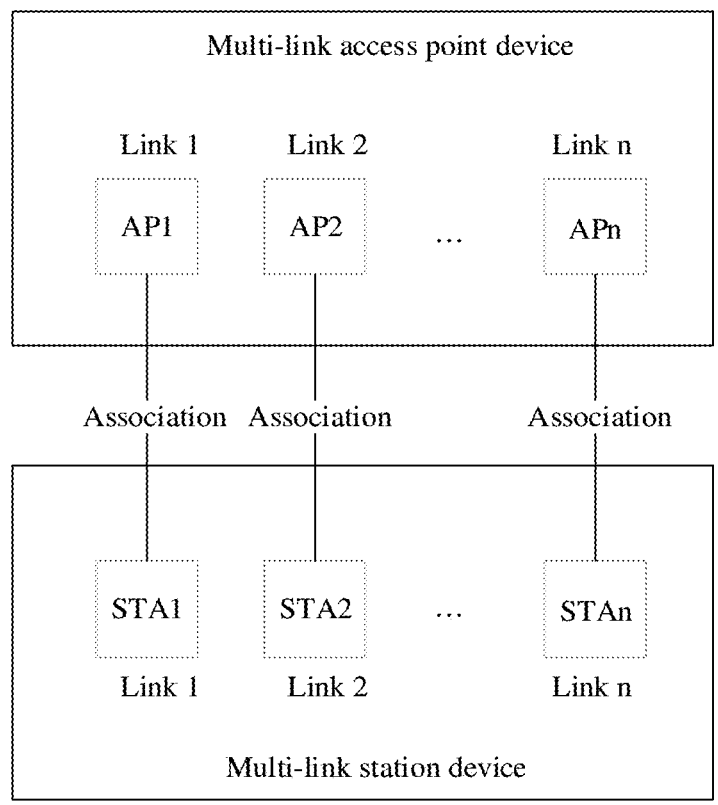
FIG. 2 is a schematic diagram of multi-link association according to an embodiment of this application.

The following uses an association process of a multi-link device as an example to describe specific implementation of an association request frame used in the association process. As shown in FIG. 2, in a multi-link establishment (or multi-link association) process, one station in a multi-link station device may send an association request frame to one access point in a multi-link access point device, where the association request frame carries an MLE for carrying information of a current station of the multi-link station device and information of another station in the multi-link device. Similarly, an association response frame returned by the access point to the station may also carry an MLE for carrying information of a current access point of the multi-link access point device and information of another access point in the multi-link device.

The foregoing content briefly describes the system architecture in embodiments of this application. To better understand the technical solutions in embodiments of this application, the following describes content related to embodiments of this application.

I. Format of an MLE

Figure 3:
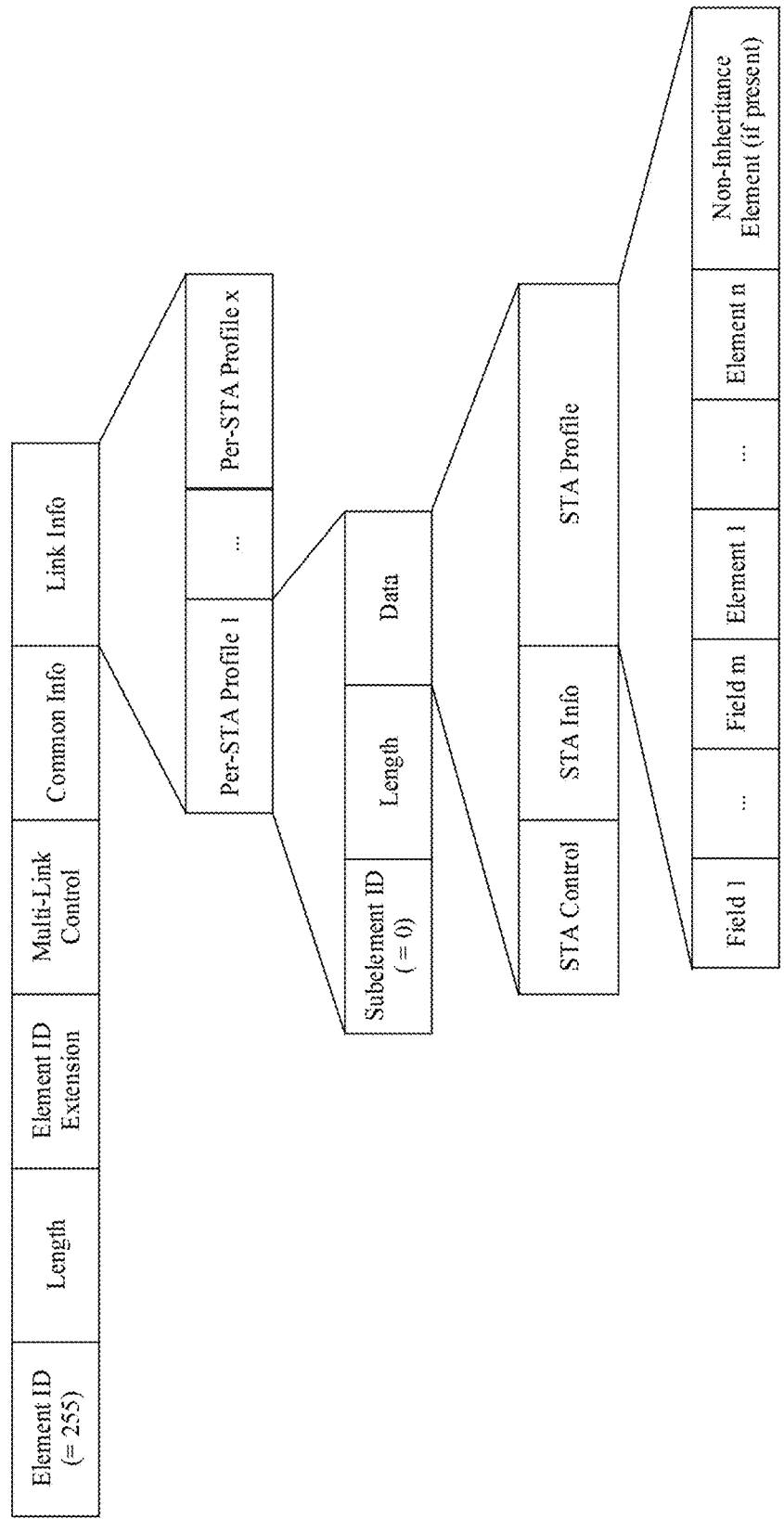
FIG. 3 is a schematic diagram of a radio frame according to an embodiment of this application.

FIG. 3 is a schematic diagram of a format of an MLE. The MLE includes an element identifier (Element ID) field (for example, a value of this field may be 255 shown in FIG. 3), a length field, an element identifier extension (Element ID Extension) field, a multi-link control field, a common information (Common Info) field, and a link information (Link Info) field. The common info field carries common information of a plurality of stations in a multi-link device and information of the multi-link device. The link info field carries information of a station on each link in the multi-link device. The multi-link control field carries a type of the multi-link element, and indication information indicating which fields are present and which fields are not present in the common info field.

Further, as shown in FIG. 3, the link info field may further include one or more per-STA profile fields. In FIG. 3, an example in which a quantity of per-STA profile fields is x (x is greater than 1) is used. Each per-STA profile field may further include a subelement identifier (subelement ID) field (for example, a value of the subelement ID field may be 0 shown in FIG. 3), a length field, and a data field.

Further, as shown in FIG. 3, the data field may further include a station control field, a station information (STA Info) field, and a station profile (STA Profile) field.

Further, as shown in FIG. 3, the STA profile field includes a plurality of fields. For example, a quantity of fields is m (x is greater than 1) in FIG. 3. The STA profile field further includes a plurality of elements. For example, a quantity of elements is n (n is greater than 1) in FIG. 3. In addition, the STA profile field further includes a non-inheritance element (if present).

However, as shown in FIG. 3, a length of content that can be carried by the MLE is limited, and a specific length of the MLE is indicated by the length field in the MLE. Specifically, the length field indicates a quantity of octets following the length field in the MLE. For example, a length of the length field in the MLE is 8 bits, which indicates a length of 0 to 255 octets. However, a length of information that needs to be carried in the MLE may exceed 255 octets, resulting that only one MLE is insufficient to carry the information of the multi-link device.

In addition, the information of a station on each link in the multi-link device is carried in the subelement per-STA profile in the link info field, while a length of each per-STA profile is also limited. For example, a length of the length field in the per-STA profile is 8 bits, so that the data field can carry a maximum of 255 octets. However, the information of a station on each link may be longer than 255 octets, resulting that only one per-STA profile is insufficient to carry the information of a station on each link.

II. Multiple BSSID

The current 802.11 standard supports the feature of multiple basic service set identifier set (multiple BSSID, or may be referred to as a multiple BSSID set). A basic function of the multiple BSSID set is to form a plurality of virtual APs in one device to serve different types of STAs. A plurality of virtual APs may be centrally managed to reduce management costs.

A multiple BSSID set may be a combination of some cooperative APs, and all the cooperative APs use a same operating class, a same channel number, and a same antenna port. Generally, in a multiple BSSID set, there is an AP corresponding to a transmitted BSSID, and APs corresponding to nontransmitted BSSIDs. Information about a multiple BSSID set (that is, a multiple BSSID element) is carried in a management frame (for example, a beacon frame, a probe response frame, or a neighbor report) sent by a transmitted BSSID AP. Information of a BSSID of the nontransmitted BSSID AP is derived based on the multiple BSSID element or the like in the received beacon frame, probe response frame, or neighbor report.

In addition, in a multiple BSSID technology, one physical AP may be virtualized into a plurality of logical APs. Each virtual AP manages one BSS. Different virtual APs usually have different SSIDs and permission, such as security mechanisms or transmission opportunities. A BSSID corresponding to one virtual AP in the plurality of APs obtained through virtualization is configured as a transmitted BSSID. The virtual AP may be referred to as a transmitted AP. BSSIDs corresponding to other virtual APs are configured as nontransmitted BSSIDs. These virtual APs may be referred to as nontransmitted APs. Generally, a plurality of APs in a multiple BSSID may also be understood as a plurality of cooperative AP devices obtained by virtualizing one AP device. Only an AP whose BSSID is a transmitted BSSID can send a beacon frame and a probe response frame. If a probe request frame sent by a STA is destined for an AP whose BSSID is a nontransmitted BSSID in a multiple BSSID set, the AP whose BSSID is the transmitted BSSID needs to assist in replying with a probe response frame. The beacon frame sent by the AP whose BSSID is the transmitted BSSID includes a multiple BSSID element, and the APs whose BSSIDs are nontransmitted BSSIDs cannot send a beacon frame. Association identifiers (AID) allocated by a plurality of virtual APs to stations managed by the plurality of virtual APs share one space, meaning that the AIDs allocated to the stations managed by the plurality of virtual BSSs cannot be the same.

Optionally, as shown in Table 1, the multiple BSSID element includes the following fields: element ID, length, max BSSID indicator, and subelements. A value (n) of the max BSSID indicator field is for calculating a maximum quantity $2^n$ (that is, 2 raised to the power of n) of BSSIDs included in the multiple BSSID set. The optional subelements include information of each nontransmitted BSSID. A receiving end may calculate a value of each BSSID in the multiple BSSID set based on a reference BSSID, the max BSSID indicator, and a BSSID index. Each BSSID includes 48 bits. A value of most significant (48−n) bits of each BSSID in the multiple BSSID set equals to a value of most significant (48−n) bits of the reference BSSID, and a value of least significant n bits of each BSSID in the multiple BSSID set is obtained by performing a modulo operation on a sum of a value of least significant n bits of the reference BSSID and a value of the BSSID index x by $2^n$. The reference BSSID (the transmitted BSSID) is carried in a BSSID field in a MAC header of a frame (for example, a beacon frame) including the multiple BSSID element. For a specific calculation method, refer to the 802.11-2016 standard.

TABLE 1

|  | Element ID | Length | Max BSSID indicator | Optional subelements |
|---|---|---|---|---|
| Octet | 1 | 1 | 1 | Variable |

Table 2 shows the "optional subelements" listed in Table 1.

TABLE 2

| Subelement ID | Name | Extensible |
|---|---|---|
| 0 | Nontransmitted BSSID profile | Non-extensible |
| 1-220 | Reserved |  |
| 221 | Vendor specific | Vendor defined |
| 222-255 | Reserved |  |

Optionally, in Table 2, the nontransmitted basic service set identifier profile (Nontransmitted BSSID profile) includes a list of elements for one or more APs or directional multi-gigabit stations (DMG STA) that have nontransmitted BSSIDs.

Optionally, in Table 2, the nontransmitted BSSID profile includes but is not limited to the following elements.

1. For each nontransmitted BSSID, a nontransmitted BSSID capability element and a variable quantity of elements in a beacon frame are included.

2. A service set identifier (SSID) element and a multiple BSSID-index element are included. The multiple BSSID-index element includes a BSSID index field.

3. If the multiple BSSID element is carried in the beacon frame, a first missing PDCP sequence number descriptor (First Missing PDCP SN descriptor, FMS Descriptor) element is further included.

4. The following elements are not included: timestamp and beacon interval fields, direct sequence spread spectrum parameter set (DSSS Parameter Set), independent basic service set parameter set (IBSS Parameter Set), country (Country), channel switch announcement, extended channel switch announcement, wide bandwidth channel switch, transmit power envelope, and supported operation classes (Supported Operating Classes), IBSS DFS, ERP information (ERP Information), high throughput capabilities (HT Capabilities), HT operation, VHT capabilities, VHT operation, SIG beacon compatibility, short beacon interval, SIG capabilities, SIG operation (nah), and the like. These elements have same values as those of the transmitted BSSID AP.

5. A non-inheritance element (optional) appearing as the last element is included. The non-inheritance element includes IDs and element ID extension numbers of a series of elements that the nontransmitted BSSID cannot be inherited from the transmitted BSSID. It should be noted that specific content of the elements is omitted herein. Specifically, as shown in Table 3, the non-inheritance element includes the following fields: element ID, length, element ID extension, element ID list, and element ID extension list. The element ID extension number is present only when a value of the element ID field is 255.

TABLE 3

| Non-inheritance element | | | | |
|---|---|---|---|---|
| 1 octet | 1 octet | 1 octet | One or more octets | One or more octets |
| Element ID | Length | Element ID extension | Element ID list | Element ID extension list |

Figure 4A:
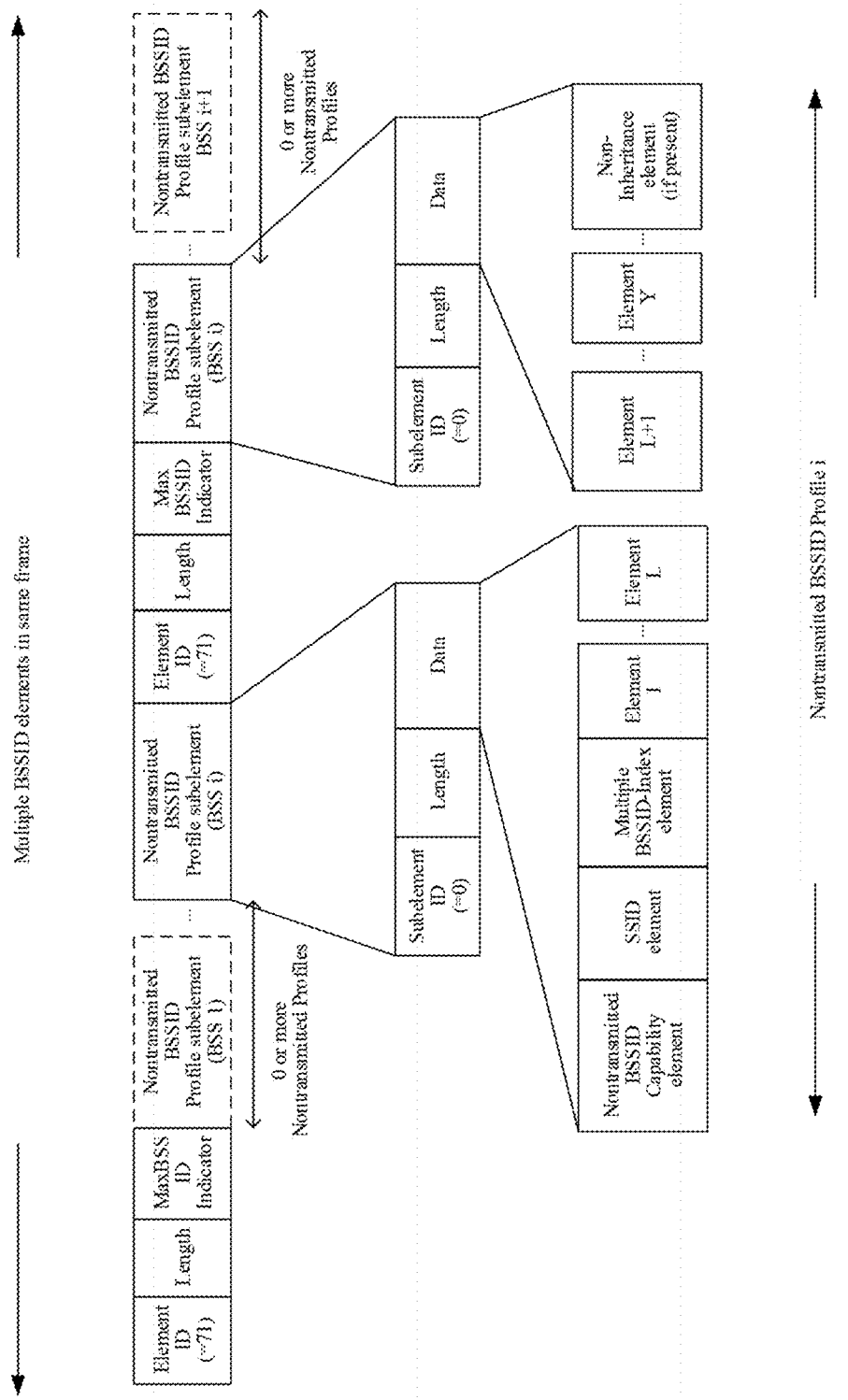
FIG. 4a is another schematic diagram of a radio frame according to an embodiment of this application.

One of implementation examples of the frame format of the multiple BSSID element for carrying the multiple BSSID set may be shown in FIG. 4a.

As shown in FIG. 4a, the structure of the radio frame includes two adjacent multiple basic service set identifier elements (Multiple BSSID element). Each of the multiple BSSID elements includes the following fields: an element identifier (Element ID) field (for example, a value of the element ID field is 71 shown in FIG. 4a), a length field, a maximum BSS identifier indicator (Max BSSID Indicator) field, and a nontransmitted BSSID profile subelement (or referred to as a Nontransmitted BSSID Profile) field. There are 0 or more nontransmitted BSSID profile subelement fields (o or more Nontransmitted BSSID Profile). In FIG. 4a, an example in which a quantity of nontransmitted BSSID profile subelement fields is i (where i is greater than 1) is used.

Further, as shown in FIG. 4a, nontransmitted BSSID profile subelement i (BSS i) includes a subelement ID field (for example, a value of the subelement ID field is 0), a length field, and a data field.

Further, as shown in FIG. 4a, the data field includes a nontransmitted BSSID capability element field, a service set identifier element (SSID element), a multiple BSSID-index element, one or more elements, and a non-inheritance element (if present). In the example shown in FIG. 4a, nontransmitted BSSID profile subelement i in the $1^{st}$ multiple BSSID element includes elements 1 to L (L is greater than 1), and nontransmitted BSSID profile subelement i in the $2^{nd}$ multiple BSSID element includes element (L+1) to element Y (Y is greater than L).

In the implementation example shown in FIG. 4a, in the data portion of the nontransmitted BSSID profile subelement, stations (STA/AP) corresponding to "element 1" to "element L" in the data portion may be identified by the basic service set identifier index (BSSID Index) in the multiple BSSID-index element.

Specifically, the multiple BSSID element carries information of a plurality of virtual APs in a multiple BSSID set to which an AP belongs. The length field occupies 8 bits, indicating that a maximum of 255 octets can be carried. However, a length of the information of the plurality of virtual APs may exceed 255 octets. Therefore, a plurality of multiple BSSID elements are used to carry the information of the plurality of virtual APs. As shown in FIG. 4a, the 1st multiple BSSID element carries a first portion of information of BSS 1 to BSS i, and the $2^{nd}$ multiple BSSID element carries the remaining portion of information of BSS i and information of BSS (i+1). Content of the two multiple BSSID elements may be concatenated, to obtain information of BSS 1 to BSS (i+1). Information of each BSS starts with a nontransmitted BSSID capability element.

III. Combination of Multiple BSSID and Multi-Link

For a device that supports both multi-link communication and a multiple BSSID set, a multiple BSSID may exist on each link, and APs from different multiple BSSID sets may form an MLD, but transmitted BSSIDs are not necessarily located in the same MLD.

Figure 5:
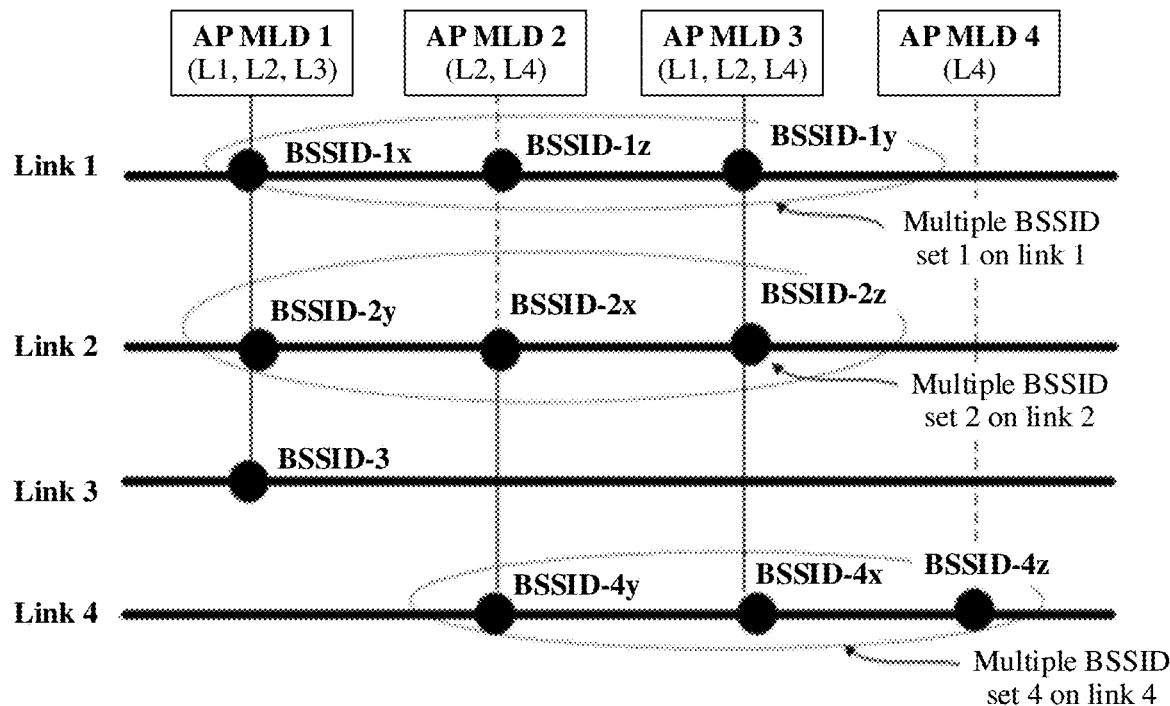
FIG. 5 is another schematic diagram of a communication system according to an embodiment of this application.

For example, an implementation example of a structure of the device is shown in FIG. 5.

For example, in the scenario shown in FIG. 5, four AP MLDs are included. AP MLD1 includes an AP numbered BSSID-1x (corresponding to link L1), an AP numbered BSSID-2y (corresponding to link L2), and an AP numbered BSSID-3 (corresponding to link L3). AP MLD2 includes an AP numbered BSSID-1z (corresponding to link L1), an AP numbered BSSID-2x (corresponding to link L2), and an AP numbered BSSID-4y (corresponding to link L4). AP MLD3 includes an AP numbered BSSID-1y (corresponding to link L1), an AP numbered BSSID-2z (corresponding to link L2), and an AP numbered BSSID-4x (corresponding to link L4). AP MLD4 includes an AP numbered BSSID-4z (corresponding to link L4). It should be noted that a link number and a link identifier in the figure are not a same concept. The link identifier represents a group of the following for identifying a specific AP: an operating set, a channel number, and a MAC address (or a BSSID) of an AP.

For example, an AP ended with a number "x" is an AP corresponding to a transmitted BSSID, and an AP ended not with the number "x" (for example, "y" or "z") is an AP corresponding to a nontransmitted BSSID. To be specific, multiple BSSID set 1 on link 1 includes a transmitted BSSID BSSID-1x and nontransmitted BSSIDs BSSID-1z and BSSID-1y; multiple BSSID set 2 on link 2 includes a transmitted BSSID BSSID-2x and nontransmitted BSSIDs BSSID-2z and BSSID-2y; link 3 includes BSSID-3 (which is considered as not belonging to a multiple BSSID set, with no need to distinguish between a transmitted BSSID and a nontransmitted BSSID); and multiple BSSID set 4 on link 4 includes a transmitted BSSID BSSID-4x and nontransmitted BSSIDs BSSID-4z and BSSID-4y.

For ease of description, an "AP corresponding to BSSID-n" is referred to as "AP-n" for short below. In the scenario shown in FIG. 5, n may be 1x, 1y, 1z, 2x, 2y, 2z, 3, 4x, 4y, 4z, or the like.

In some implementation processes, in the implementation scenario shown in FIG. 5, if AP-1x serves as a reporting AP (a sender of a radio frame), the radio frame sent by AP-1x may carry an MLE corresponding to an MLD (AP MLD1) in which AP-1x is located. The MLE carries station information of a plurality of stations (including AP-2y and AP-3) in the AP MLD1. A frame format of the MLE carried in the radio frame may be the same as the implementation process shown in FIG. 3. Generally, the MLE carried in the radio frame is, by default, an MLE corresponding to an MLD in which the reporting AP is located. Therefore, a receiver of the radio frame determines (with no need to include additional indication information) that the MLE carried in the radio frame corresponds to the MLD in which the reporting AP is located.

For example, AP-1x may feed back a probe response frame in response to a probe request frame of a station (STA). By default, an MLE included in the probe response frame corresponds to a multi-link access point device (AP MLD1) with which AP-1x sending the probe response frame is affiliated, meaning that information carried in the MLE is information of stations of the multi-link access point device with which the AP sending the radio frame is affiliated (information of stations AP-2y and AP-3).

However, in this scenario, AP-1x may need to feed back information of another MLD in the radio frame. For example, the probe request frame of the STA requests information of an MLD (AP MLD2 or AP MLD3) with which an AP corresponding to a nontransmitted basic service set identifier (nontransmitted BSSID) on a link in which AP-1x is located is affiliated. In this case, how AP-1x feeds back the radio frame is an urgent technical problem to be resolved.

Figure 6:
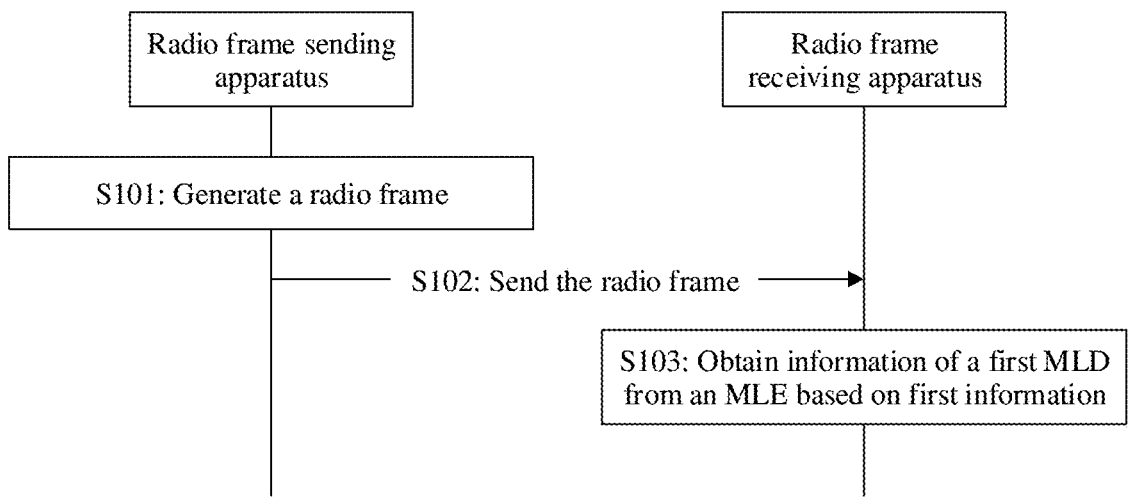
FIG. 6 is a schematic diagram of a communication method according to an embodiment of this application.

FIG. 6 is a schematic diagram of a communication method according to this application. The method includes the following steps. It may be understood that, as shown in FIG. 6, the communication method relates to transmission of a radio frame. Therefore, the communication method may also be referred to as a radio frame sending method, or referred to as a radio frame receiving method.

S101: A radio frame sending apparatus generates a radio frame.

In this embodiment, the radio frame sending apparatus generates the radio frame in step S101. The radio frame includes an MLE, the MLE carries information of a first MLD, the MLE includes first information, and the first information identifies the first MLD.

The radio frame sending apparatus may be a first AP, or a component (for example, a processor, a chip, or a chip system) of the first AP.

S102: The radio frame sending apparatus sends the radio frame.

In this embodiment, after generating the radio frame in step S101, the radio frame sending apparatus sends the radio frame in step S102. Accordingly, a radio frame receiving apparatus receives the radio frame in step S102.

The radio frame sending apparatus may be a STA, or a component (for example, a processor, a chip, or a chip system) of the STA.

Optionally, the first AP may perform sending preprocessing on the radio frame, and send, in step S102, a processing result obtained through sending preprocessing. For example, the sending preprocessing may include encryption, scrambling, and the like. Accordingly, the STA may receive the processing result (obtained by performing sending preprocessing on the radio frame by the first AP), and perform receiving preprocessing on the processing result in step S102 to obtain the radio frame. For example, the receiving preprocessing may include decryption, descrambling, and the like.

S103: The radio frame receiving apparatus obtains the information of the first MLD from the MLE based on the first information.

In a possible implementation, the radio frame is a multi-link probe response (ML Probe Response) frame. Specifically, the communication method shown in FIG. 6 may be applied to a multi-link probe process. After receiving a multi-link probe request (ML Probe Request) frame, the first AP may generate and send the multi-link probe response frame, to execute the multi-link probe process.

In a possible implementation, in the MLE included in the radio frame sent by the first AP in step S102, the first information is a multi-link device identifier (MLD ID) field. Specifically, the first information may alternatively be another field name, for example, a multi-link identifier, a multi-link device index, or a multi-link index.

Figure 7:
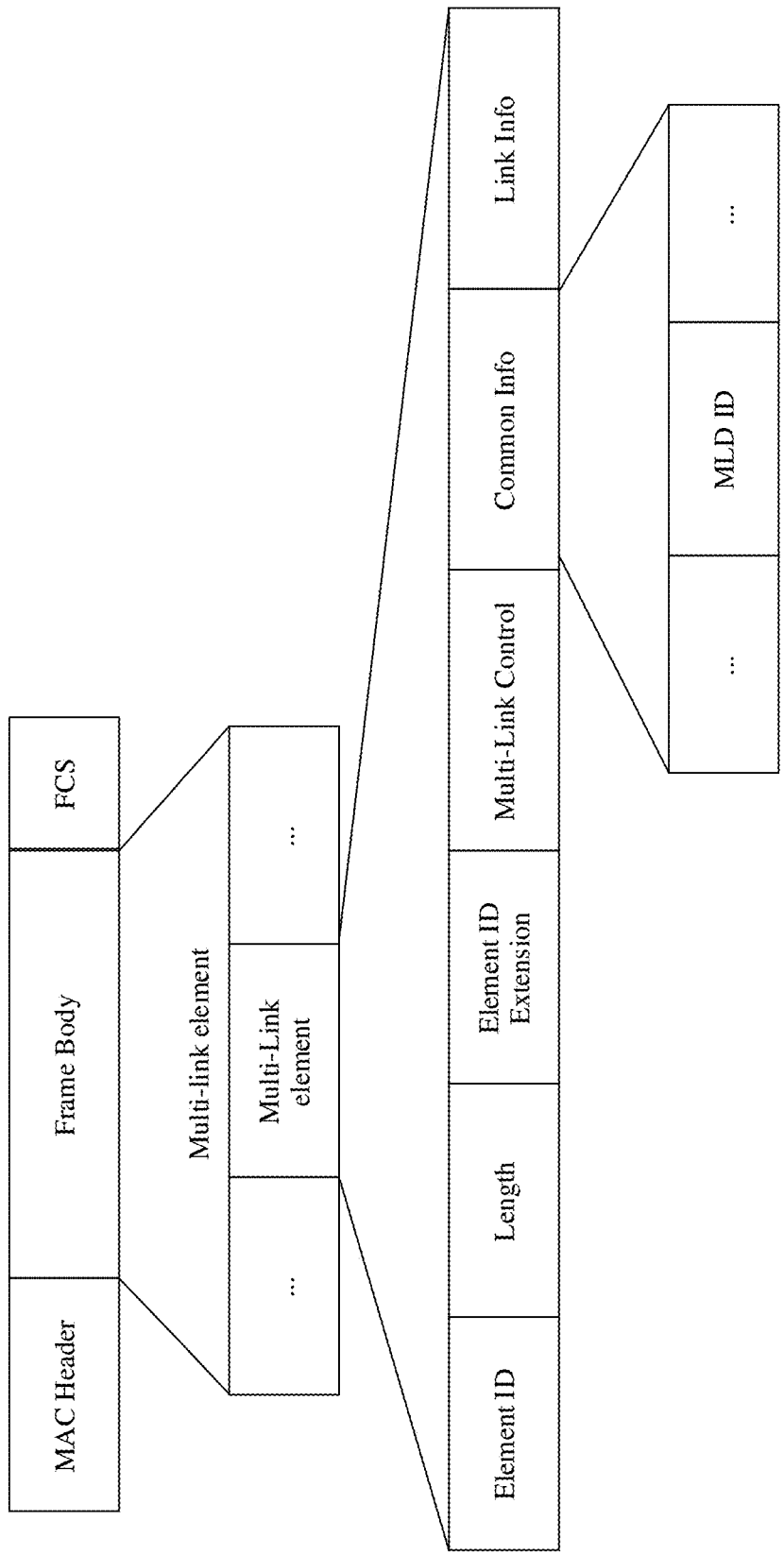
FIG. 7 is another schematic diagram of a radio frame according to an embodiment of this application.

For example, the MLE included in the radio frame sent by the first AP in step S102 includes a common information field, and the first information may be located in the common information field. FIG. 7 is an implementation example of a format of the MLE in the radio frame. For definitions of elements/fields included in FIG. 7, refer to the foregoing descriptions about FIG. 3. The first information may be located in the "common information" field of a "multi-link element" in a "frame body" in the radio frame. In FIG. 7, an example in which the first information is named "multi-link identifier (MLD ID)" is used.

In a possible implementation, in step S102, the MLE carried in the radio frame corresponds to the first MLD identified by the first information, the first AP serves as a reporting AP (a sender) of the radio frame, and an association relationship between the first AP and the first MLD may be implemented differently. For example, a value of the first information (the MLD ID field) equal to 0 indicates that the MLE in the radio frame carries the information of the MLD in which the first AP is located. A value of the first information (the MLD ID field) equal to another value indicates that the MLE in the radio frame carries information of another MLD.

Optionally, "another MLD" may be an MLD co-located (collocated) with the first AP. The "MLD co-located (collocated)" with the first AP may indicate an MLD located in a same physical device as the first AP. Further, the first AP may learn of, with no need to perform signal detection or measurement, an attribute of the MLD co-located (collocated) with the first AP.

Optionally, the "another MLD" may be alternatively an MLD with which another AP in a same multiple BSSID set as the first AP is affiliated, or may be an MLD with which another AP carried in an RNR element in the radio frame by the first AP is affiliated, or may be another implementation. This is not limited herein.

The following provides descriptions using specific examples.

Implementation 1: The first AP is not affiliated with the first MLD.

Specifically, the MLE included in the radio frame sent by the first AP in step S102 is the information of the first MLD, and the first AP serves as the sender of the radio frame and is not affiliated with the first MLD. In other words, a device (which may be a single-link device or a multi-link access point device) in which the first AP is located is a device other than the first MLD. Therefore, this solution may be applied to a scenario in which the first AP sends information of another MLD (the first MLD). The receiver of the radio frame may also obtain in step S103, in the case in which the receiver of the radio frame is not associated with the first AP, the information of the first MLD based on the radio frame sent by the first AP.

For example, the scenario shown in FIG. 5 is used as an implementation example. For example, AP-1x serves as a reporting AP (the first AP sending the radio frame in step S102). When the first AP is not affiliated with the first MLD, the first MLD may be an AP MLD other than AP MLD1, for example, AP MLD2, AP MLD3, and AP MLD4.

In addition, in the case in which the first AP is not affiliated with the first MLD, the first MLD may have a plurality of implementations. The following provides descriptions using specific examples.

In a possible implementation of Implementation 1, the first MLD is an MLD in which a second AP in a same BSSID set as the first AP is located.

For example, the scenario shown in FIG. 5 is used as an implementation example. For example, AP-1x serves as a reporting AP (the first AP sending the radio frame in step S102). When the first AP is not affiliated with the first MLD, the first MLD may be an MLD with which an AP is affiliated, where the AP and AP-1x are located on a same link. In other words, the first MLD is AP MLD2 with which AP-1z is affiliated or AP MLD3 with which AP-1y is affiliated.

In this implementation, the radio frame sent by the first AP in step S102 further includes a multiple BSSID element. The multiple BSSID element includes index information of a BSSID of the second AP, and a value of the index information of the BSSID of the second AP is the same as a value of the first information.

Optionally, the description that the first MLD is an MLD in which a second AP in a same BSSID set as the first AP is located may also be expressed as: The first MLD includes a second AP in a same multiple basic service set identifier BSSID set as the first AP.

Specifically, when the first AP is not affiliated with the first MLD, the first MLD may be specifically an MLD with which the second AP in the same BSSID set as the first AP is located, so that the multiple basic service set identifier element (Multiple BSSID element) in the radio frame sent by the first AP may carry information of the second AP. The multiple BSSID element may carry the index information of the BSSID of the second AP. Therefore, in the case in which the first MLD corresponding to the MLE in the radio frame includes the second AP, a value of the index information of the BSSID of the second AP in the multiple BSSID element is the same as the value of the first information in the MLE, to indicate that the information of the second AP in the multiple BSSID element and information carried in the MLE correspond to a same MLD (the first MLD).

Figure 8:
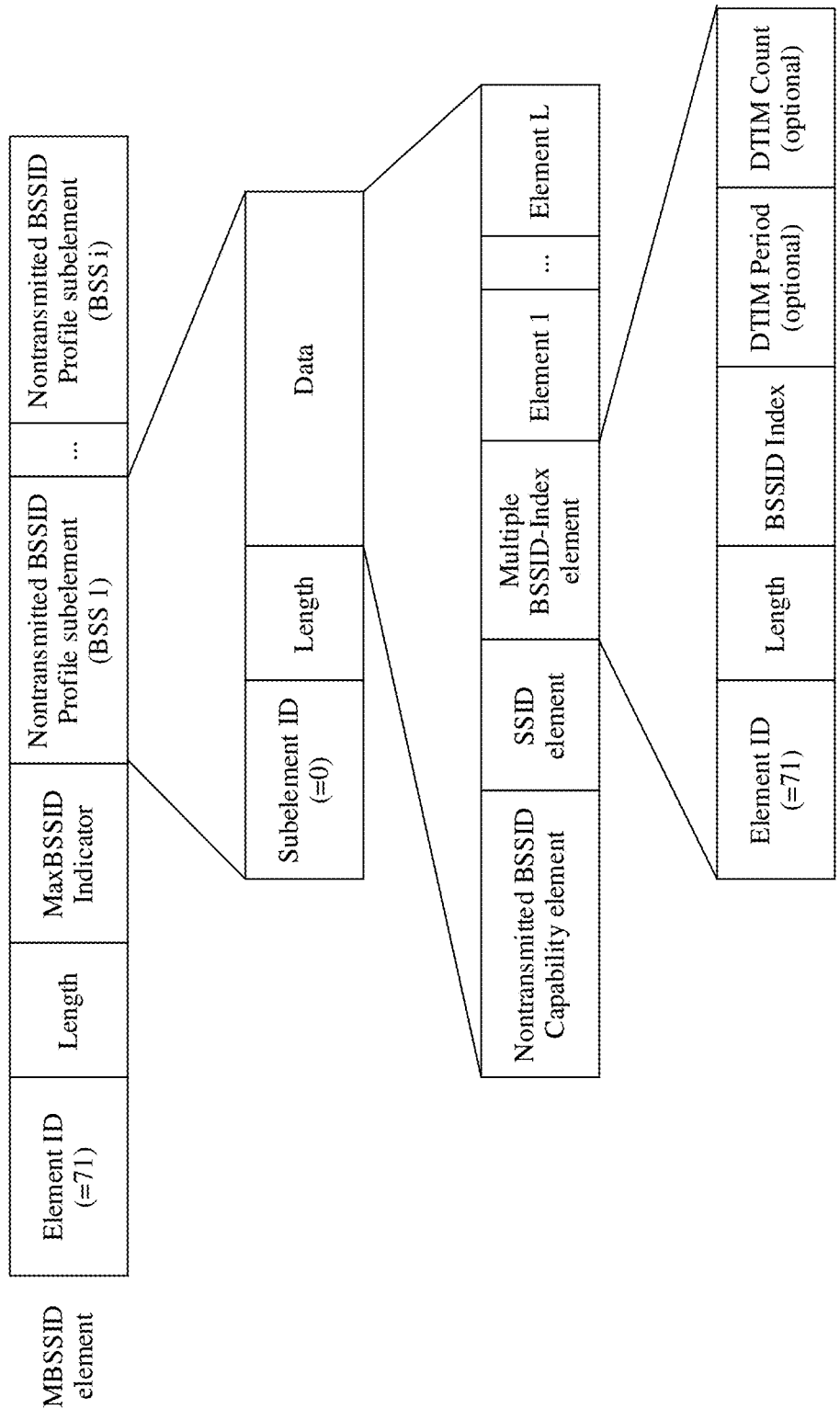
FIG. 8 is another schematic diagram of a radio frame according to an embodiment of this application.

A format shown in FIG. 8 is an implementation example of the multiple BSSID element included in the radio frame sent by the first AP in step S102. For definitions of elements/fields included in FIG. 8, refer to the foregoing descriptions about FIG. 4a.

Specifically, when a nontransmitted BSSID profile subelement (BSS 1) shown in FIG. 8 corresponds to a BSS of the second AP, a multiple BSSID-index element in a data portion in the nontransmitted BSSID profile subelement (BSS 1) carries a basic service set identifier index (BSSID Index) for identifying a BSSID index of the second AP. In this case, in the radio frame sent in step S102, the first AP sets the value of the index information of the BSSID of the second AP in the multiple BSSID element to be the same as the value of the first information in the MLE, to indicate that the information of the second AP in the multiple BSSID element and the information carried in the MLE correspond to the same MLD (the first MLD).

Figure 9:
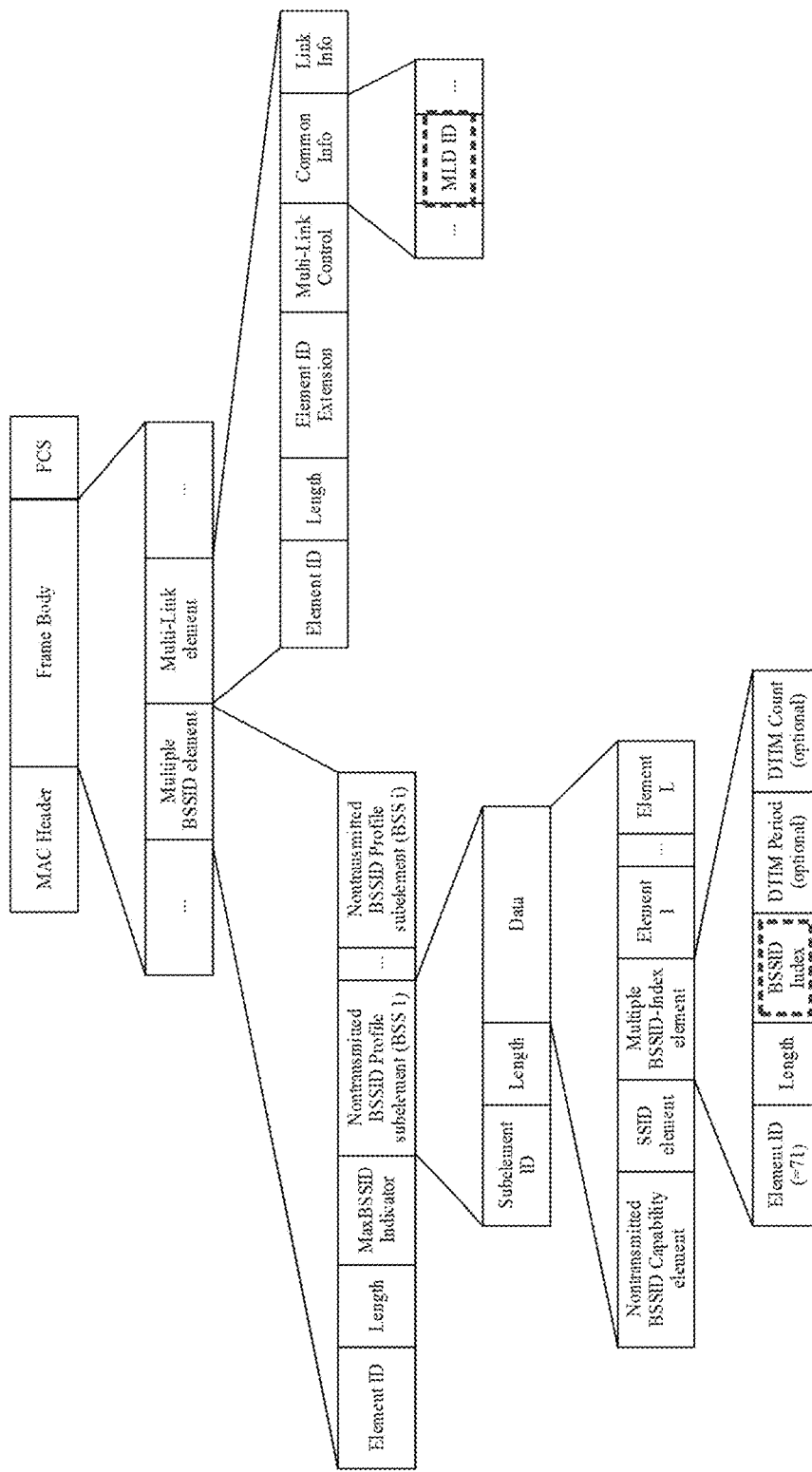
FIG. 9 is another schematic diagram of a radio frame according to an embodiment of this application.

A format shown in FIG. 9 is another implementation example of the multiple BSSID element and the multi-link element (MLE) included in the radio frame sent by the first AP in step S102. For definitions of elements/fields included in FIG. 9, refer to the descriptions in FIG. 3 and FIG. 4a. Specifically, as shown in FIG. 9, the two fields denoted by dashed boxes have a same value, meaning that a value of the field "BSSID index" in the multiple BSSID element is the same as a value of the field "MLD ID" in the multi-link element.

In a possible implementation, the MLE included in the radio frame sent by the first AP in step S102 includes a first per-STA profile element, the first per-STA profile element carries information of a third AP, and the third AP is affiliated with the first MLD. A value of a first element of the third AP is the same as a value of a first element of the second AP when the first per-STA profile element does not include the first element of the third AP.

For example, the scenario shown in FIG. 5 is used as an implementation example. For example, AP-1x serves as a reporting AP (the first AP sending the radio frame in step S102). When the first AP is not affiliated with the first MLD, the first MLD may be an MLD with which an AP is affiliated, where the AP and AP-1x are located on a same link. In other words, the first MLD is AP MLD2 with which AP-1z is affiliated or AP MLD3 with which AP-1y is affiliated. Assuming that the first MLD is AP MLD2 with which AP-1z is affiliated, the second AP may be AP-1z, and the third AP may be AP-2x or AP-4y.

Optionally, a non-inheritance element in the first per-STA profile element does not include the first element.

Optionally, the first per-STA profile element is a completely configured element. In other words, a value of a complete profile field in the first per-STA profile element is 1.

Optionally, the description that a value of a first element of the third AP is the same as a value of a first element of the second AP when the first per-STA profile element does not include the first element of the third AP may also be expressed as follows: When a first element of a station (the second AP) in the multiple BSSID element carried in a radio frame sent by a reporting station (the first AP) is not present in a complete profile element of a reported station (the third AP), it is considered that the first element is a portion of the complete profile element of the reported station, and a value of the first element in the multiple BSSID element is the same as a value of the first element in the complete profile element of the reported station, unless the complete profile element of the reported station carries a non-inheritance element and the first element is present in the non-inheritance element.

Specifically, the first MLD may further include the third AP different from the second AP, where the MLE includes the first per-STA profile element for carrying the information of the third AP. Because some information of different APs in the same MLD is the same, when the first per-STA profile element does not include the first element of the third AP, the value of the first element of the third AP is the same as the value of the first element of the second AP. Therefore, the first element of the third AP may inherit the first element of the second AP. This facilitates the receiver of the radio frame to determine the first element of the third AP in step S103 based on the first element of the second AP carried in the multiple BSSID element.

In addition, the MLE included in the radio frame sent by the first AP in step S102 may further include a first field. A first value of the first field indicates that the value of the first element of the third AP is the same as the value of the first element of the second AP. Specifically, the MLE may further carry the first field. The first value of the first field indicates that the value of the first element of the third AP is the same as the value of the first element of the second AP. In this way, the receiver of the radio frame determines, based on the first field in the MLE in step S103, that the first element of the third AP may inherit the first element of the second AP. In other words, the receiver of the radio frame determines, based on the first field in the MLE in step S103, that the value of the first element of the third AP is the same as the value of the first element of the second AP.

Figure 10:
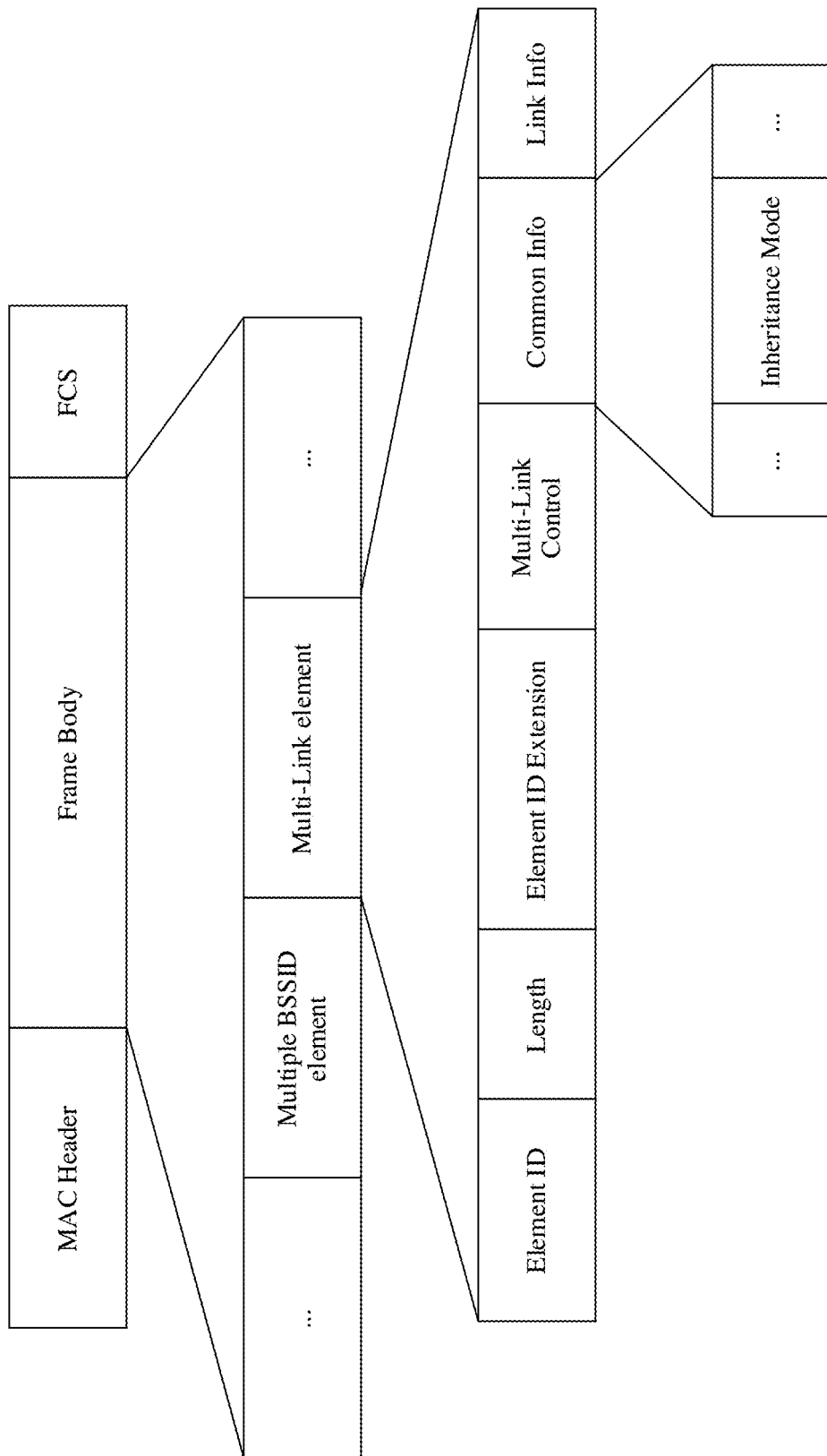
FIG. 10 is another schematic diagram of a radio frame according to an embodiment of this application.

Further, the first field is located in a multi-link control field in the MLE, or the first field is located in the common information (Common Info) field in the MLE A format shown in FIG. 10 is an implementation example of the multiple BSSID element and the multi-link element (MLE) included in the radio frame sent by the first AP in step S102. For definitions of elements/fields included in FIG. 10, refer to the descriptions in FIG. 3 and FIG. 4a. In FIG. 10, for example, the first field is named "inheritance mode (Inheritance Mode)" (where the first field may alternatively be named differently). The first field is located in the "common information (Common Info)" field in the "multi-link element (MLE)".

Figure 11:
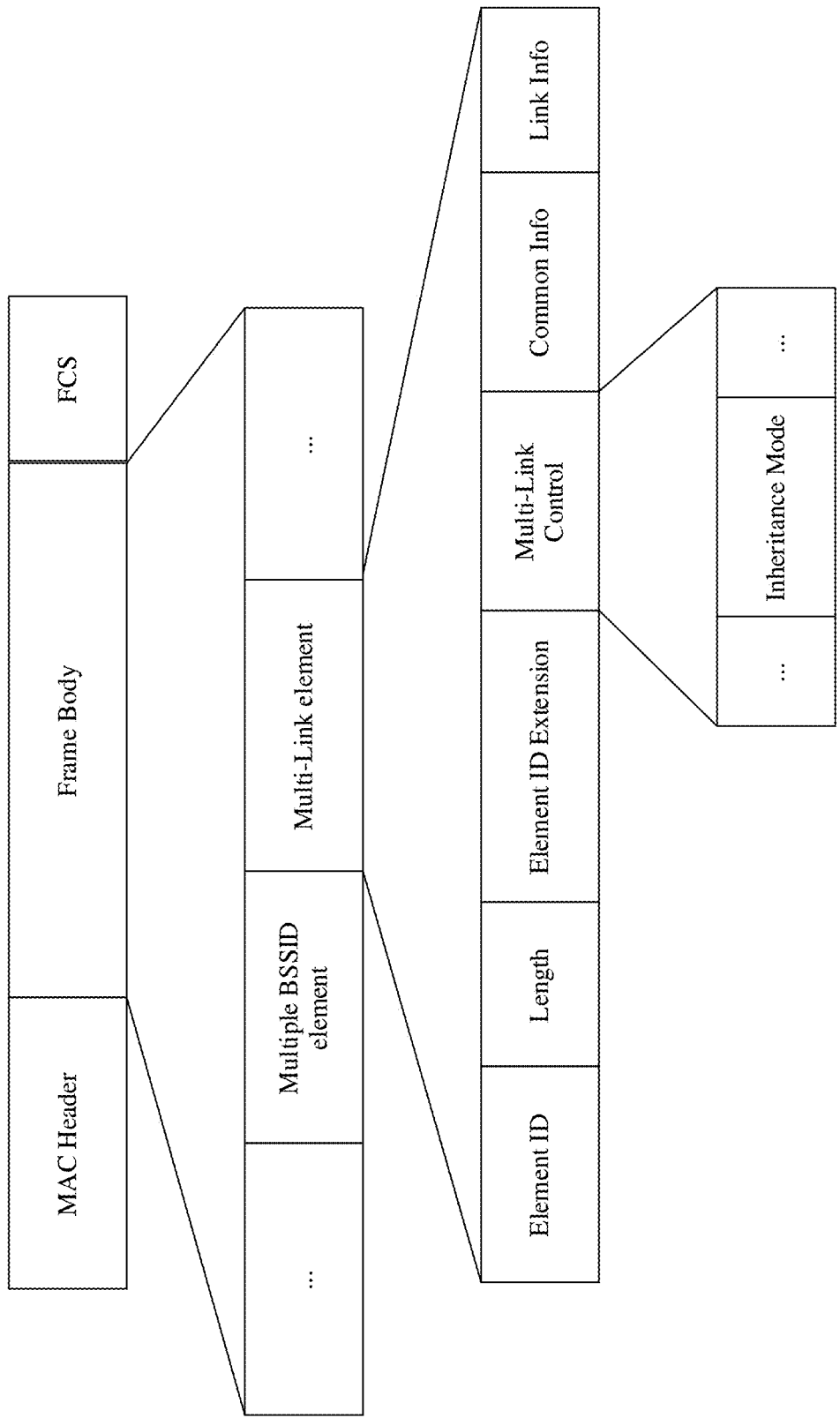
FIG. 11 is another schematic diagram of a radio frame according to an embodiment of this application.

A format shown in FIG. 11 is another implementation example. Different from the format shown in FIG. 10, the first field in the format shown in FIG. 11 is located in the "multi-link control (Multi-Link Control)" field in the "multi-link element (MLE)".

In a possible implementation, the value of the first element of the second AP is the same as the value of the first element of the first AP.

Optionally, the first element of the AP in the first MLD is located in the frame body (Frame body) of the radio frame.

Optionally, a non-inheritance element in an element of the second AP in the multiple BSSID element does not include the first element.

Optionally, the element of the second AP in the multiple BSSID element is a completely configured element. In other words, a value of a complete profile field in the element of the second AP in the multiple BSSID element is 1.

Optionally, the description that the value of the first element of the second AP is the same as the value of the first element of the first AP may also be expressed as follows: When the element of the second AP in the multiple BSSID element does not include the first element of the second AP, the value of the first element of the second AP is the same as the value of the first element of the first AP. Alternatively, the description may be expressed as: when a first element carried (information indicating the first element of the first AP) in a radio frame sent by a reporting station (the first AP) is not present in the complete profile element of the second AP in the multiple BSSID element, it is considered that the first element is a portion of the complete profile element of the second AP in the multiple BSSID element, and the value of the first element in the complete profile element of the second AP in the multiple BSSID element is the same as the value of the first element in the radio frame, unless the complete profile element of the second AP in the multiple BSSID element carries a non-inheritance element, and the first element is present in the non-inheritance element.

Based on the foregoing technical solution, because some information of different APs in a same multiple BSSID set is the same, when the multiple BSSID element does not include the first element of the second AP, the value of the first element of the second AP is the same as the value of the first element of the first AP. Therefore, the first element of the second AP may inherit the first element of the first AP.

This facilitates the receiver of the radio frame to determine the first element of the third AP in step S103 based on the first element of the first AP carried in the radio frame.

In another possible implementation of Implementation 1, the first MLD includes a fourth AP, where information of the fourth AP is carried in an RNR element in the radio frame.

The radio frame sent by the first AP in step S102 further includes the RNR element, where the RNR element includes the information of the fourth AP and includes second information for identifying the first MLD. The value of the first information is the same as a value of the second information. Specifically, the radio frame further includes the RNR element for reporting the information of the fourth AP. The RNR element includes the second information for identifying the first MLD with which the fourth AP is affiliated, and the value of the first information is the same as the value of the second information. Therefore, in the case in which the first MLD corresponding to the MLE in the radio frame includes the fourth AP, the value of the second information in the RNR element for identifying the first MLD with which the fourth AP is affiliated is the same as the value of the first information in the MLE, to indicate that the information of the fourth AP in the RNR element and information carried in the MLE correspond to a same MLD (the first MLD).

Optionally, the first MLD may include at least one of the following AP: the second AP, the third AP, and the fourth AP; or the first MLD may include another AP (for example, another neighboring AP); or the first MLD may include an AP corresponding to any per-STA profile element carried in the MLE. This is not limited herein.

Figure 12:
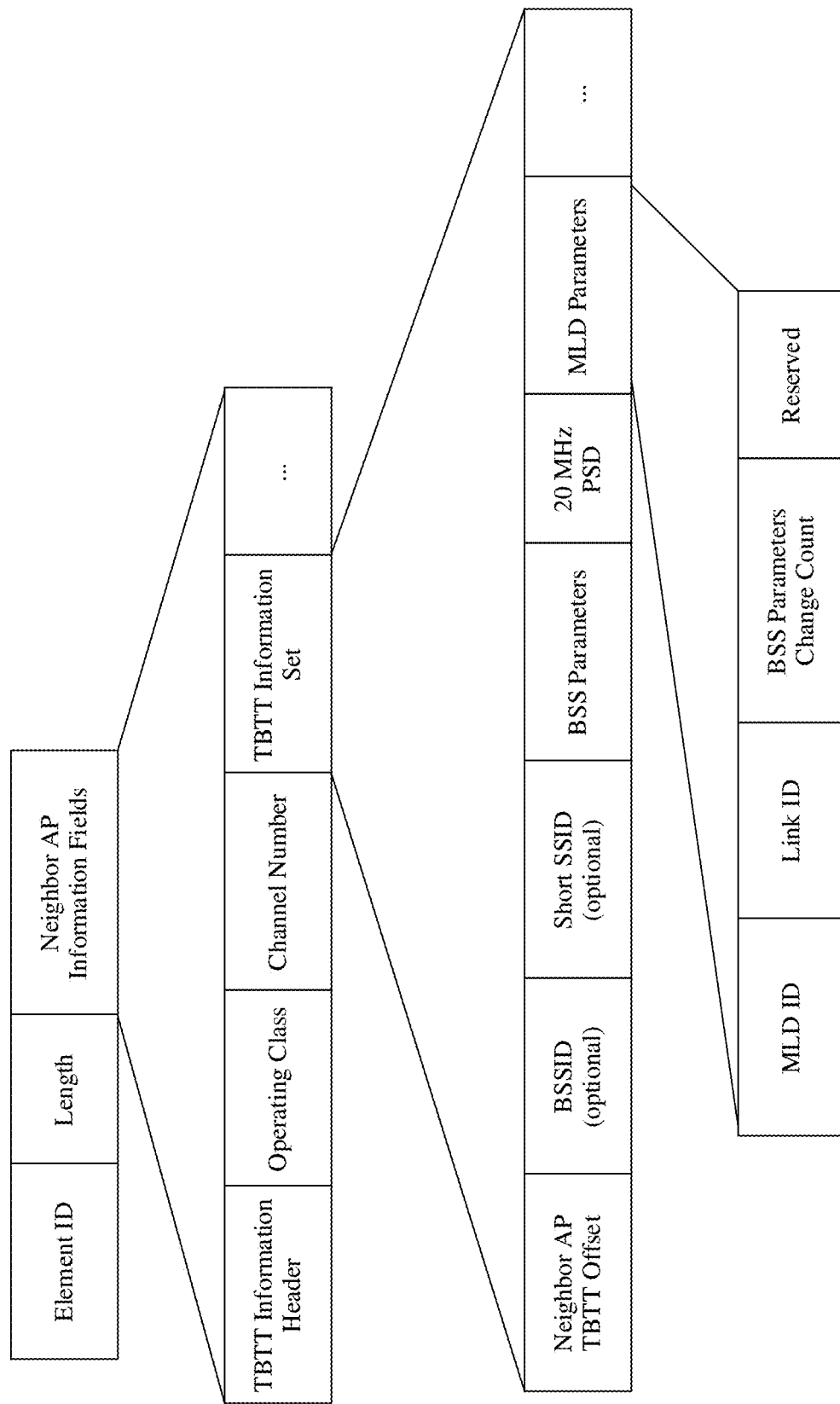
FIG. 12 is another schematic diagram of a radio frame according to an embodiment of this application.

FIG. 12 shows an implementation example of the RNR element.

Specifically, for an AP, the reduced neighbor report element is carried in a management frame, for example, a beacon frame or a probe response frame. When scanning, a station STA receives an association frame sent by the AP, to obtain information of surrounding APs, and then selects a suitable AP for association.

It should be noted that, in this embodiment and subsequent embodiments, a neighboring AP may be specifically an AP around an AP (denoted as a target AP herein) that sends the reduced neighbor report element (Reduced Neighbor Report element, RNR element for short). For example, the neighboring AP is an AP on another link in an AP MLD in which the target AP is located. For another example, the neighboring AP is an AP adjacent to the target AP. For another example, the neighboring AP is an AP detected in an operating area of the target AP. For another example, the neighboring AP is an AP co-located with the target AP. Alternatively, the AP is defined in another way. This is not specifically limited herein.

Specifically, the RNR element indicates information of one or more neighboring APs on a specific channel. FIG. 12 shows a frame format of the RNR element, including an element identifier (Element ID) field and a length field indicating a length of carried information. In addition, each RNR element carries one or more neighbor AP information (Neighbor AP info) fields. The neighbor AP information field may also be referred to as an information field of a neighboring AP for short. The following provides descriptions about information included in each neighbor AP information field with reference to FIG. 12. Each neighbor AP information field includes the following information.

1. Target beacon transmission times information header (TBTT info Header) field.

2. Operating class field: which indicates an operating class to which an operating channel of a reporting neighboring AP belongs. In this field, values such as 0 and 255 are reserved.

3. Channel number field: which indicates a channel number corresponding to an operating channel of a reporting neighboring AP. In this field, the value 0 of the channel number field is a reserved value. In addition, the STA may determine a specific location of a channel of the AP on a frequency band based on the operating class field and the channel number field.

4. TBTT information set (TBTT info set) field: which includes one or more TBTT info fields. In addition, a frame format of each TBTT info field may be implemented in the implementation shown in FIG. 12. As shown in FIG. 12, each TBTT info field may include the following information.

a. Neighboring AP target beacon transmission times offset (Neighbor AP TBTT offset) field: which indicates an offset between a beacon sending time for a BSS of a reporting neighboring AP and a beacon sending time for a BSS for sending the report. The offset is measured in time units (TUs), and one TU equals to 1024 microseconds or 1 millisecond. The value 254 indicates an offset of 254 TUs or higher, and the value 255 indicates an unknown offset value. A quantity of bits occupied by the field may be 1.

b. BSS identifier (BSSID) field: which indicates a BSS identifier corresponding to the reporting BSS. A quantity of octets occupied by this field may be 0 or 6. This field is optional.

c. Short service set identifier (Short SSID) field: which indicates a service set identifier to which the BSS belongs. A quantity of octets occupied by this field may be 0 or 4. This field is optional.

d. BSS parameter field: which indicates a related parameter of the BSS. A quantity of octets occupied by this field may be 0 or 1. This field is optional.

e. 20 MHz power spectral density (PSD) field: which indicates a maximum transmit power spectral density. This field is optional. A quantity of octets occupied by this field may be 0 or 1.

f. Multi-link device parameters (MLD Parameters) field: which indicates an MLD-related parameter. A quantity of octets occupied by this field may be 0 or 3. The MLD parameters field includes the following subfields: a multi-link device identifier (MLD ID) subfield, which occupies 8 bits and indicates an identifier of an AP MLD; a link identifier (Link ID) subfield, which occupies 4 bits and indicates a link identifier corresponding to a reporting neighboring AP; a BSS parameters change counter (BSS Parameters Change Count) subfield, which occupies 8 bits and indicates a BSS parameters change counter; and a reserved subfield, which occupies 4 bits. When a key change occurs on the reporting AP, the BSS parameters change counter increases. Otherwise, the BSS parameters change counter remains unchanged.

Therefore, when the "multi-link device identifier (MLD ID) subfield" in the multi-link device parameters (MLD Parameters) field shown in FIG. 12 corresponds to the first MLD in which the fourth AP is located, the "multi-link device identifier (MLD ID) subfield" in the multi-link device parameters (MLD Parameters) field identifies the first MLD with which the fourth AP is affiliated. In this case, in the radio frame sent in step S102, the first AP sets a value of the "multi-link device identifier (MLD ID) subfield" in the multi-link device parameters (MLD Parameters) field to be the same as the value of first information in the MLE, to indicate that the first MLD with which the fourth AP is affiliated identified by the "multi-link device identifier (MLD ID) subfield" in the multi-link device parameters (MLD Parameters) field and the information carried in the MLE correspond to a same MLD (the first MLD).

Further, the MLE included in the radio frame sent by the first AP in step S102 includes a second per-STA profile element, and the second per-STA profile element carries information of an AP in the first MLD. A value of a first element of the AP in the first MLD is the same as the value of the first element of the first AP when the second per-STA profile element does not include the first element of the AP in the first MLD.

Optionally, the first element of the AP in the first MLD is located in the frame body of the radio frame.

Optionally, a non-inheritance element in the second per-STA profile element does not include the first element.

Optionally, the second per-STA profile element is a completely configured element. In other words, a value of a complete profile field in the second per-STA profile element is 1.

Optionally, the description that a value of a first element of the AP in the first MLD is the same as the value of the first element of the first AP when the second per-STA profile element does not include the first element of the AP in the first MLD may also be expressed as: When a first element carried (information indicating the first element of the first AP) in a radio frame sent by a reporting station (the first AP) is not present in a complete profile element of a reported station (the AP in the first MLD), it is considered that the first element is a portion of the complete profile element of the reported station, and the value of the first element in the radio frame is the same as a value of the first element in the complete profile element of the reported station, unless the complete profile element of the reported station carries a non-inheritance element and the first element is present in the non-inheritance element.

Based on the foregoing technical solution, the MLE includes the second per-STA profile element for carrying the information of the AP in the first MLD. Because some information of the first MLD is the same as that of the first AP (or an MLD in which the first AP is located), when the second per-STA profile element does not include the first element of the AP in the first MLD, the value of the first element of the AP in the first MLD is the same as the value of the first element of the first AP. Therefore, the first element of the AP in the first MLD may inherit the first element of the first AP. This facilitates the receiver of the radio frame to determine the first element of the AP in the first MLD in step S103 based on the first element of the first AP carried in the radio frame.

Further, the MLE may further include the first field. A second value of the first field indicates that the value of the first element of the AP in the first MLD is the same as the value of the first element of the first AP. Specifically, the MLE may further carry the first field. The second value of the first field indicates that the value of the first element of the AP in the first MLD is the same as the value of the first element of the first AP. In this way, the receiver of the radio frame determines, based on the first field in the MLE in step S103, that the first element of the AP in the first MLD may inherit the first element of the first AP. In other words, the receiver of the radio frame determines, based on the first field in the MLE in step S103, that the value of the first element of the AP in the first MLD is the same as the value of the first element of the first AP.

Optionally, for an implementation process of the first field, refer to the foregoing descriptions (including FIG. 10 and FIG. 11). Details are not described herein again.

Implementation 2: The first AP is affiliated with the first MLD.

In Implementation 2, the MLE included in the radio frame is the information of the first MLD, and the first AP serves as a sender of the radio frame and is affiliated with the first MLD. In other words, the first AP is one of APs in the first MLD. Therefore, this solution may be applied to a scenario in which the first AP sends the information of the MLD (the first MLD) in which the first AP is located. The receiver of the radio frame may obtain in step S103, in a case in which the receiver of the radio frame is associated with the first AP, the information of the first MLD based on the radio frame sent by the first AP.

In addition, in comparison with an implementation in which the MLE in the radio frame carries, by default, the information of the MLD in which the sender of the radio frame is located and does not carry indication information, in this solution, because the first information in the MLE indicates the MLD corresponding to the MLE, the receiver of the radio frame may determine in step S103, based on the first information, that the MLD corresponding to the first MLE is the MLD in which the first AP is located. In addition, the solution may also be used in a scenario in which the radio frame carries MLEs corresponding to MLDs other than the radio frame sender. In other words, based on the setting of the first information, the solution is applicable to a scenario in which the radio frame carries a plurality of MLEs corresponding to a plurality of MLDs (including the MLD in which the radio frame sender is located, that is, the first MLD).

For example, the scenario shown in FIG. 5 is used as an implementation example. For example, AP-1x serves as a reporting AP (the first AP sending the radio frame in step S102). When the first AP is affiliated with the first MLD, the first MLD may be AP MLD1, meaning that the information of the first MLD carried in the MLE includes information of stations AP-2y and AP-3.

In conclusion, based on the description of Implementation 1 or Implementation 2, it can be learned that the radio frame sent by the first AP in step S102 includes the MLE for carrying the information of the first MLD, where the MLE includes the first information for identifying the first MLD. Therefore, the receiver of the radio frame may obtain the information of the first MLD from the MLE based on the first information in step S103 after receiving the radio frame. In other words, after receiving the radio frame, the receiver of the radio frame may determine, based on the first information, that the MLE corresponds to the first MLD in step S103. In comparison with an implementation in which the radio frame cannot carry an MLE corresponding to another MLD because the MLE in the radio frame carries, by default, information of the MLD in which the sender of the radio frame is located and does not carry indication information, in this solution, based on the setting of the first information, the MLE carried in the radio frame may carry an MLE corresponding to an MLD other than the sender of the radio frame. Therefore, the receiver of the radio frame may obtain, based on the MLE, information of stations on a plurality of links on which the first MLD is located, so that the receiver of the radio frame communicates with the first MLD.

In addition, in comparison with an implementation in which a field indirectly indicating an MLD corresponding to the MLE is carried in a location other than the MLE in the radio frame (for example, the basic service set identifier index (BSSID Index) is carried in the multiple BSSID-index element in the multiple BSSID element of the radio frame, to indirectly indicate an MLD with which an AP/STA corresponding to the MLE in the multiple BSSID element is affiliated, where the AP/STA is indicated by an SSID), in the foregoing implementation, because the MLE includes the first information (in other words, the first information is carried inside the MLE), the receiver of the radio frame may determine, based on the MLE, the MLD corresponding to the MLE in step S103, with no need to obtain an indirect indication from outside the MLE, so as to obtain information of stations of the first MLD in step S103. This improves communication efficiency.

In the implementation scenario shown in FIG. 5, if AP-1x serves as a reporting AP (the sender of the radio frame), the radio frame sent by AP-1x may carry MLEs corresponding to MLDs (AP MLD2 and AP MLD3) in which other APs in a same multiple BSSID set (the multiple BSSID set 1 on the link 1) as the AP-1x are located, one of the MLEs carries station information of a plurality of stations (including AP-2x and AP4y) in the AP MLD2, and the other MLE carries station information of a plurality of stations (including AP-2z and AP-4x) in the AP MLD3.

An MLE for carrying station information of a plurality of stations (including AP-2x and AP-4y) in AP MLD2 is used as an example. The MLE is carried in the data portion of the nontransmitted BSSID profile subelement (BSS i, that is, a BSS corresponding to AP-1z) in the format shown in FIG. 4a. For example, the MLE is located in any one of "element 1" to "element L".

Limited by a length of each "element", when AP MLD2 includes a large amount of information, a plurality of nontransmitted BSSID profile subelements may be used to carry the MLE corresponding to the AP MLD2. For an implementation process, refer to the implementation example shown in FIG. 4b. In comparison with the implementation process in FIG. 4a, FIG. 4b describes in detail that "element L" in the data portion of the nontransmitted BSSID profile subelement carries a portion of the MLE (for an implementation example of the MLE, refer to the description in FIG. 3), and "element L+i" in the data portion of another nontransmitted BSSID profile subelement carries the other portion of the MLE It can be learned from the foregoing description in FIG. 4a that the basic service set identifier index (BSSID Index) in the multiple BSSID index element (Multiple BSSID-Index element) may identify a station (STA/AP) corresponding to the "element 1" to "element L" in the data portion. In other words, in the implementation example shown in FIG. 4b, a value of the basic service set identifier index (BSSID Index) in the multiple BSSID index element (Multiple BSSID-Index element) is a BSSID of AP-1z, to indirectly indicate that the MLE carried by "element L and element L+1" belong to the MLD with which AP-1z is affiliated.

Figure 4B:
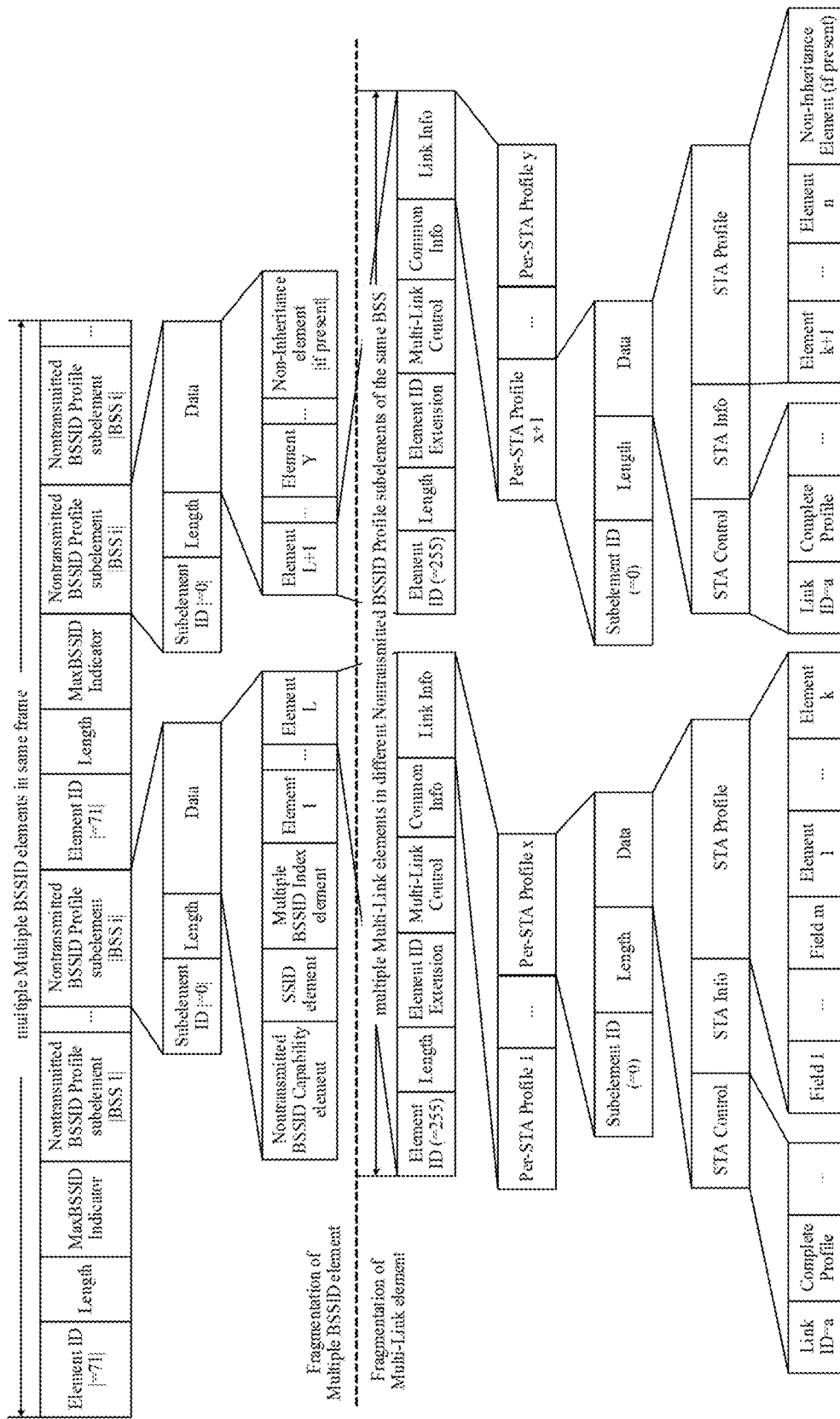
FIG. 4b is another schematic diagram of a radio frame according to an embodiment of this application.

However, in the implementation example shown in FIG. 4b, in a case in which the MLE carried in the radio frame needs to be fragmented due to long length, because transmission in the case of fragmentation of the MLE carried in the multiple BSSID element is complex, parsing complexity is high for the receiver of the radio frame.

Therefore, in the communication method shown in FIG. 6, the foregoing problem may be resolved by improving information carried in the radio frame.

In a possible implementation, the radio frame sent by the first AP in step S102 further includes a fragment element adjacent to the MLE. The MLE carries a first portion of the information of the first MLD, and the fragment element carries a second portion of the information of the first MLD.

Specifically, in the WLAN communication process, a length of information that can be carried by an MLE may be fixed (for example, 255 octets). Therefore, a case in which one MLE is insufficient to carry the information of the first MLD may occur first due to the length limitation. In this case, different portions of the information of the first MLD may be separately carried in the MLE and one or more fragment elements adjacent to the MLE, so that the information of the first MLD is completely transmitted.

In addition, in comparison with an implementation in which different portions of information of the MLD are carried in a plurality of non-adjacent subelements, that is, carried in locations other than the MLE in the radio frame (for example, information of a same MLD is carried in different subelements of data portions of a plurality of nontransmitted BSSID profile subelements in the multiple BSSID element of the radio frame), in the foregoing solution, because the MLE and one or more pieces of fragment information are adjacent in the radio frame, the receiver of the radio frame may obtain the information of the same MLD from the MLE and the one or more pieces of fragment information adjacent to the MLE in step S103, instead of separately reading information from a plurality of non-adjacent subelements, so as to obtain station information of the first MLD in step S103. This improves communication efficiency.

In comparison with the implementation process shown in FIG. 4b, in the foregoing solution, when information carried in the MLE in the radio frame is relatively long (for example, fragmentation needs to be performed when a length of the MLE is greater than 255 octets). Because the MLE is no longer located in the multiple BSSID element as shown in FIG. 4b, but is located outside the multiple BSSID element, fragmentation does not need to be performed on the multiple BSSID element since the multiple BSSID element is not excessively long.

For example, when the MLE is separately fragmented, the MLE may be fragmented into one MLE and one or more fragment elements.

Figure 13:
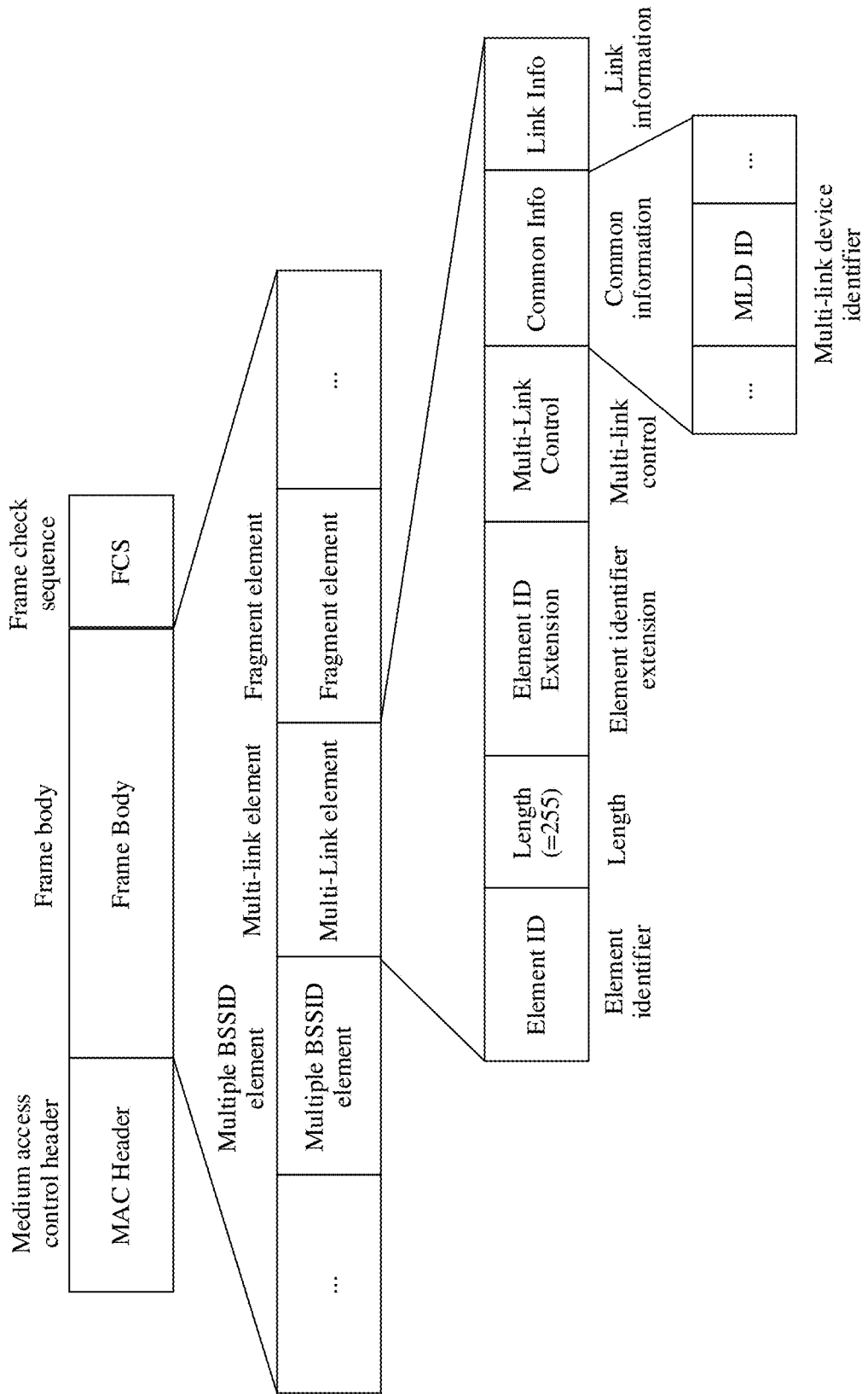
FIG. 13 is another schematic diagram of a radio frame according to an embodiment of this application.

A format shown in FIG. 13 is an implementation example of the multiple BSSID element, the multi-link element (MLE), and the fragment element included in the radio frame sent by the first AP in step S102. For definitions of elements/fields included in FIG. 13, refer to the descriptions in FIG. 3 and FIG. 4a.

In the example shown in FIG. 13, a quantity of information elements included in the fragment element is 1, the fragment element includes a length field, and a value of the length field is less than or equal to 255.

Figure 14:
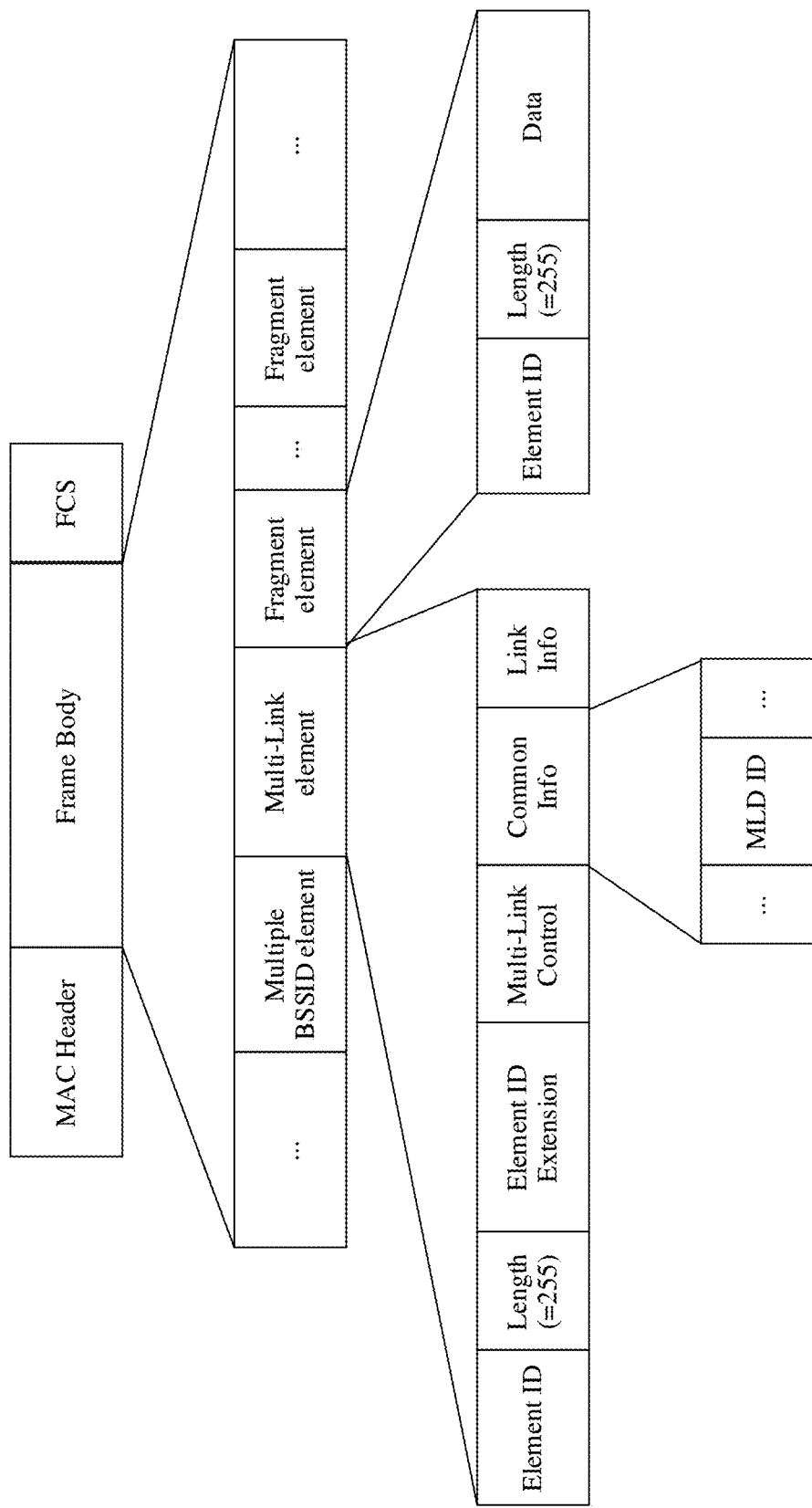
FIG. 14 is another schematic diagram of a radio frame according to an embodiment of this application.

A format shown in FIG. 14 is another implementation example. Different from the format shown in FIG. 13, the format shown in FIG. 14 includes a plurality of fragment elements.

In the example shown in FIG. 14, the fragment element includes n information elements, a value of a length field of each information element except for the last information element in the n information elements is 255, where n is an integer greater than 1.

The foregoing describes this application from the perspective of methods, and the following further describes this application from the perspective of apparatuses.

Figure 15:
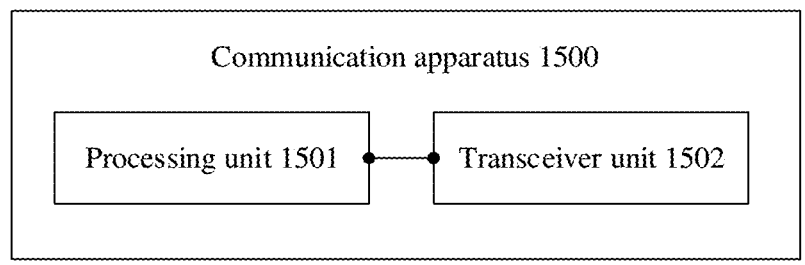
FIG. 15 is a schematic diagram of a communication apparatus according to an embodiment of this application.

FIG. 15 is a schematic diagram of a communication apparatus 1500 according to an embodiment of this application. The communication apparatus 1500 includes a processing unit 1501 and a transceiver unit 1502.

In an implementation, the communication apparatus 1500 may be specifically a radio frame sending apparatus, configured to implement the radio frame sending method in the embodiment shown in FIG. 6. Correspondingly, the processing unit 1501 and the transceiver unit 1502 may be configured to perform the following process.

The processing unit 1501 is configured to generate a radio frame, where the radio frame includes a multi-link element MLE, the MLE carries information of a first multi-link device MLD, the MLE includes first information, and the first information identifies the first MLD.

The transceiver unit 1502 is configured to send the radio frame for a first AP.

Based on the foregoing technical solution, in the WLAN communication process, the radio frame sent by the transceiver unit 1502 includes the MLE for carrying the information of the first MLD, where the MLE includes the first information for identifying the first MLD. Therefore, a receiver of the radio frame may obtain the information of the first MLD from the MLE based on the first information after receiving the radio frame. In other words, after receiving the radio frame, the receiver of the radio frame may determine, based on the first information, that the MLE corresponds to the first MLD. Therefore, the receiver of the radio frame may obtain, based on the MLE, information of stations on a plurality of links on which the first MLD is located, so that the receiver of the radio frame communicates with the first MLD.

In addition, in comparison with an implementation in which a field indirectly indicating an MLD corresponding to the MLE is carried in a location other than the MLE in the radio frame (for example, a basic service set identifier index (BSSID Index) is carried in a multiple BSSID-index element in a multiple BSSID element of the radio frame, to indirectly indicate an MLD with which an AP/STA corresponding to the MLE in the multiple BSSID element is affiliated, where the AP/STA is indicated by an SSID), in the foregoing implementation, because the MLE includes the first information (in other words, the first information is carried inside the MLE), the receiver of the radio frame may determine, based on the MLE, the MLD corresponding to the MLE, with no need to obtain an indirect indication from outside the MLE, so that the receiver of the radio frame obtains information of stations of the first MLD. This improves communication efficiency.

In another implementation, the communication apparatus 1500 may alternatively be a radio frame receiving apparatus, configured to implement the radio frame receiving method in the embodiment shown in FIG. 6. Correspondingly, the processing unit 1501 and the transceiver unit 1502 may be configured to perform the following process.

The transceiver unit 1502 is configured to receive a radio frame from a first access point AP, where the radio frame includes a multi-link element MLE, the MLE carries information of a first multi-link device MLD, the MLE includes first information and the first information identifies the first MLD.

The processing unit 1501 is configured to obtain the information of the first MLD from the MLE based on the first information.

Based on the foregoing technical solution, in the WLAN communication process, the radio frame receiving apparatus serves as a receiver of the radio frame. The radio frame received by the transceiver unit 1502 in the receiving apparatus includes the MLE for carrying the information of the first MLD, and the MLE includes the first information for identifying the first MLD. Therefore, the receiver of the radio frame may obtain the information of the first MLD from the MLE based on the first information after receiving the radio frame. In other words, after receiving the radio frame, the receiver of the radio frame may determine, based on the first information, that the MLE corresponds to the first MLD. Therefore, the receiver of the radio frame may obtain, based on the MLE, information of stations on a plurality of links on which the first MLD is located, so that the receiver of the radio frame communicates with the first MLD.

In addition, in comparison with an implementation in which a field indirectly indicating an MLD corresponding to the MLE is carried in a location other than the MLE in the radio frame (for example, a basic service set identifier index (BSSID Index) is carried in a multiple BSSID-index element in a multiple BSSID element of the radio frame, to indirectly indicate an MLD with which an AP/STA corresponding to the MLE in the multiple BSSID element is affiliated, where the AP/STA is indicated by an SSID), in the foregoing implementation, because the MLE includes the first information (in other words, the first information is carried inside the MLE), the receiver of the radio frame may determine, based on the MLE, the MLD corresponding to the MLE, with no need to obtain an indirect indication from outside the MLE, so that the receiver of the radio frame obtains information of stations of the first MLD. This improves communication efficiency.

In a possible implementation, the first AP is not affiliated with the first MLD.

In a possible implementation, the first MLD is an MLD in which a second AP in a same BSSID set as the first AP is located. The radio frame further includes a multiple BSSID element, and the multiple BSSID element includes index information of a BSSID of the second AP, where a value of the index information of the BSSID of the second AP is the same as a value of the first information.

Optionally, the description that the first MLD is an MLD in which a second AP in a same BSSID set as the first AP is located may also be expressed as: The first MLD includes a second AP in a same multiple basic service set identifier BSSID set as the first AP.

In a possible implementation, the MLE includes a first per-STA profile element, the first per-STA profile carries information of a third AP, and the third AP is affiliated with the first MLD. When the first per-STA profile element does not include a first element of the third AP, a value of the first element of the third AP is the same as a value of a first element of the second AP.

In a possible implementation, the MLE further includes a first field. A first value of the first field indicates that the value of the first element of the third AP is the same as the value of the first element of the second AP.

In a possible implementation, the first field is located in a multi-link control field in the MLE, or the first field is located in a common information (Common Info) field in the MLE.

In a possible implementation, the value of the first element of the second AP is the same as a value of a first element of the first AP.

Optionally, a first element of an AP in the first MLD is located in a frame body of the radio frame.

In a possible implementation, the first MLD includes a fourth AP. The radio frame further includes a reduced neighbor report (RNR) element. The RNR element includes information of the fourth AP and includes second information for identifying the first MLD. The value of the first information is the same as a value of the second information.

In a possible implementation, the MLE includes a second per-STA profile element, and the second per-STA profile element carries information of the AP in the first MLD. When the second per-STA profile element does not include the first element of the AP in the first MLD, a value of the first element of the AP in the first MLD is the same as the value of the first element of the first AP.

Optionally, the first MLD may include at least one of the following AP: the second AP, the third AP, and the fourth AP; or the first MLD may include another AP (for example, another neighboring AP); or the first MLD may include an AP corresponding to any per-STA profile element carried in the MLE. This is not limited herein.

Optionally, the first element of the AP in the first MLD is located in the frame body of the radio frame.

In a possible implementation, the MLE further includes the first field. A second value of the first field indicates that the value of the first element of the AP in the first MLD is the same as the value of the first element of the first AP.

In a possible implementation, the first AP is affiliated with the first MLD.

In a possible implementation, the MLE includes a common information field, and the first information is located in the common information field.

In a possible implementation, the first information is a multi-link device identifier (MLD ID) field.

Optionally, the first information may alternatively be another field name, for example, a multi-link identifier, a multi-link device index, or a multi-link index.

In a possible implementation, the radio frame further includes a fragment element adjacent to the MLE The MLE carries a first portion of the information of the first MLD, and the fragment element carries a second portion of the information of the first MLD.

Optionally, a quantity of information elements included in the fragment element is 1, the fragment element includes a length field, and a value of the length field is less than or equal to 255.

Optionally, the fragment element includes n information elements, a value of a length field of each information element except for the last information element in the n information elements is 255, where n is an integer greater than 1.

In a possible implementation, the radio frame is a multi-link probe response (ML Probe Response) frame.

It should be noted that the communication apparatus 1500 may be further configured to perform the foregoing other embodiments and achieve corresponding beneficial effects. For details, refer to the descriptions in the foregoing embodiments. Details are not described herein again.

Figure 16:
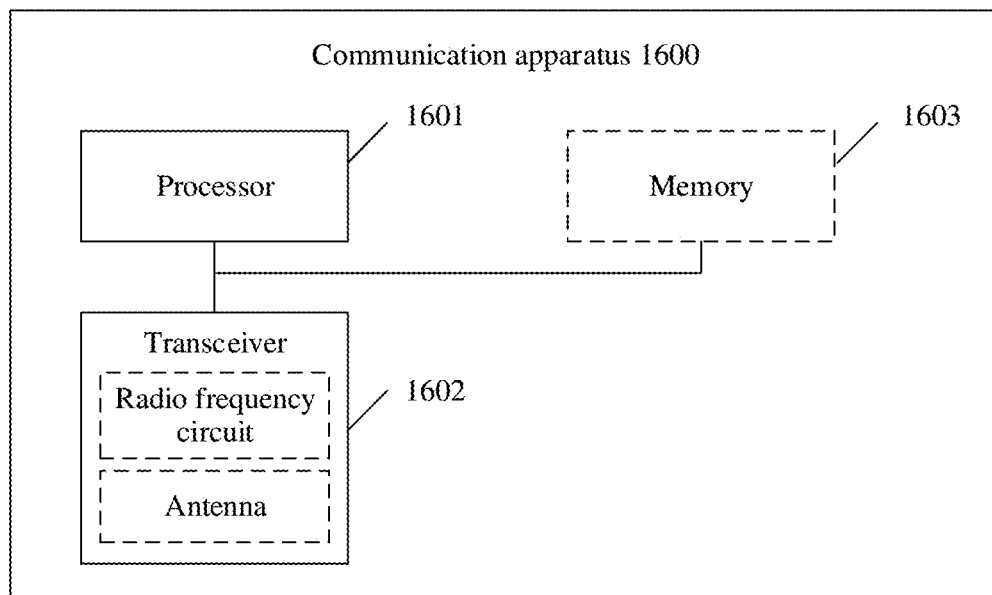
FIG. 16 is another schematic diagram of a communication apparatus according to an embodiment of this application.

FIG. 16 is a schematic diagram of a structure of a communication apparatus 1600 according to an embodiment of this application. The communication apparatus 1600 includes a processor 1601 and a transceiver 1602.

The communication apparatus 1600 may be a radio frame sending apparatus, a radio frame receiving apparatus, or a chip in a radio frame sending apparatus or a radio frame receiving apparatus.

FIG. 16 shows only main components of the communication apparatus 1600. In addition to the processor 1601 and the transceiver 1602, the communication apparatus may further include a memory 1603 and an input/output apparatus (not shown).

The processor 1601 is mainly configured to: process a communication protocol and communication data, control the entire communication apparatus, execute a software program, and process data of the software program. The memory 1603 is mainly configured to store the software program and data. The transceiver 1602 may include a radio frequency circuit and an antenna. The radio frequency circuit is mainly configured to: perform conversion between a baseband signal and a radio frequency signal, and process a radio frequency signal. The antenna is mainly configured to receive and send a radio frequency signal in the form of electromagnetic waves. The input/output apparatus, for example, a touchscreen, a display, or a keyboard, is mainly configured to receive data input by a user and output data to the user.

The processor 1601, the transceiver 1602, and the memory 1603 may be connected through a communication bus.

After the communication apparatus is powered on, the processor 1601 may read the software program from the memory 1603, interpret and execute instructions of the software program, and process data of the software program. When data needs to be sent wirelessly, the processor 1601 performs baseband processing on the to-be-sent data, and then outputs a baseband signal to the radio frequency circuit. The radio frequency circuit performs radio frequency processing on the baseband signal, and then sends, via the antenna, a radio frequency signal in the form of electromagnetic waves. When data is sent to the communication apparatus, the radio frequency circuit receives the radio frequency signal via the antenna, converts the radio frequency signal into a baseband signal, and outputs the baseband signal to the processor 1601. The processor 1601 converts the baseband signal into data for processing.

In any one of the foregoing designs, the processor 1601 may include a communication interface for implementing receiving and sending functions. For example, the communication interface may be a transceiver circuit, an interface, or an interface circuit. The transceiver circuit, the interface, or the interface circuit for implementing the receiving and sending functions may be separated, or may be integrated together. The transceiver circuit, the interface, or the interface circuit may be configured to read and write code/data, or may be configured to transmit or transfer signals.

In any one of the foregoing designs, the processor 1601 may store instructions. The instructions may be a computer program. The computer program is run on the processor 1601, so that the communication apparatus 1600 can perform the method described in the foregoing method embodiments. The computer program may be fixed in the processor 1601. In this case, the processor 1601 may be implemented by hardware.

In an implementation, the communication apparatus 1600 may include a circuit for implementing a sending, receiving, or communication function in any one of the foregoing method embodiments. The processor and the communication interface described in this application may be implemented on an integrated circuit (IC), an analog IC, a radio frequency integrated circuit (RFIC), a mixed signal IC, an application-specific integrated circuit (ASIC), a printed circuit board (PCB), an electronic device, or the like. The processor and the communication interface may be manufactured using various IC technologies, for example, a complementary metal oxide semiconductor (CMOS), an N-channel metal oxide semiconductor (N-channel Metal-oxide-semiconductor, NMOS), a P-channel metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

In another implementation, the radio frequency circuit and the antenna may be disposed independently of the processor for baseband processing. For example, in a distributed scenario, the radio frequency circuit and the antenna may be disposed remotely independent of the communication apparatus.

The communication apparatus may be an independent device or may be a part of a large device. For example, the communication apparatus may be:

(1) an independent integrated circuit IC, a chip, or a chip system or subsystem;

(2) a set including one or more ICs, where optionally, the set of ICs may further include a storage component for storing data and instructions;

(3) an ASIC, for example, a modem (Modem);

(4) a module that can be embedded in another device;

(5) a receiver, an intelligent terminal, a wireless device, a handheld device, a mobile unit, a vehicle-mounted device, a cloud device, an artificial intelligence device; or (6) another device, or the like.

In an implementation process, the processor 1601 may be configured to perform, for example but not limited to, baseband related processing; and the transceiver 1602 may be configured to perform, for example but not limited to, radio frequency receiving and sending. The foregoing components may be separately disposed on chips independent of each other, or at least some or all of the components may be disposed on a same chip. For example, the processor may further be divided into an analog baseband processor and a digital baseband processor. The analog baseband processor and the transceiver may be integrated on a same chip, and the digital baseband processor may be independently disposed on a chip. With continuous development of integrated circuit technologies, more components may be integrated on a same chip. For example, the digital baseband processor may be integrated on a same chip with a plurality of application processors (for example but not limited to a geometric processor and a multimedia processor). Such a chip may be referred to as a system on chip. Whether components are independently disposed on different chips or integrated on one or more chips usually depends on specific requirements of a product design. A specific implementation form of the foregoing components is not limited in this embodiment of the present invention.

Embodiments of this application further provide a computer-readable storage medium. The computer-readable storage medium stores computer program code. When the processor executes the computer program code, an electronic device performs the method in any one of the foregoing embodiments.

Embodiments of this application further provide a computer program product. When the computer program product runs on a computer, the computer is enabled to perform the method in any one of the foregoing embodiments.

Embodiments of this application further provide a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

Embodiments of this application further provide a WLAN communication system, including a radio frame sending apparatus and a radio frame receiving apparatus. The radio frame sending apparatus and the radio frame receiving apparatus may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a part of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium, where the communication medium includes any medium that facilitates transmission of a computer program from one place to another. The storage medium may be any available medium accessible to a general-purpose or dedicated computer.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality of. A single processor or another unit may implement several functions enumerated in the claims. Some measures are recorded in dependent claims that are different from each other, but this does not mean that these measures cannot be combined to produce better effects.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application.

What is claimed is:

1. A method, comprising:

generating, by a first access point (AP), a radio frame, wherein the radio frame comprises a multi-link element (MLE) carrying information of a first multi-link device (MLD), and the MLE further comprises an MLD identifier (ID) field identifying the first MLD, and wherein the first AP is not affiliated with the first MLD, and the first MLD includes a second AP that is in a same basic service set identifier index (BSSID) set as the first AP; and sending, by the first AP, the radio frame.

2. The method according to claim 1, wherein the radio frame further comprises a multiple BSSID element, the multiple BSSID element comprises index information of a BSSID of the second AP, and a value of the index information of the BSSID of the second AP is same as a value of the MLD ID filed.

3. The method according to claim 2, wherein the MLE comprises a first per-STA profile element, the first per-STA profile element carries information of a third AP, and the third AP is affiliated with the first MLD; and when the first per-STA profile element does not comprise a first element of the third AP, a value of the first element of the third AP is same as a value of a first element of the second AP.

4. The method according to claim 3, wherein the MLE further comprises a first field, and a first value of the first field indicates that the value of the first element of the third AP is same as the value of the first element of the second AP.

5. The method according to claim 4, wherein the first field is located in a multi-link control field in the MLE; or the first field is located in a common information field in the MLE.

6. The method according to claim 2, wherein a value of a first element of the second AP is same as a value of a first element of the first AP.

7. The method according to claim 1, wherein the first MLD comprises a fourth AP; and the radio frame further comprises a reduced neighbor report (RNR) element, the RNR element comprises information of the fourth AP and comprises first information identifying the first MLD, and a value of the first information is same as a value of the MLD ID field.

8. The method according to claim 1, wherein the MLE comprises a second per-STA profile element, and the second per-STA profile element carries information of an AP in the first MLD; and when the second per-STA profile element does not comprise a first element of the AP in the first MLD, a value of the first element of the AP in the first MLD is same as a value of a first element of the first AP.

9. The method according to claim 1, wherein the MLE comprises a common information field, and the MLD ID field is located in the common information field.

10. The method according to claim 1, wherein the radio frame is a multi-link probe response frame.

11. A first access point (AP), comprising:

a processor and a non-transitory memory, wherein the memory is configured to store a computer program, and the processor is configured to execute the computer program stored in the memory, to cause the first AP to perform:

generating a radio frame, wherein the radio frame comprises a multi-link element (MLE) carrying information of a first multi-link device (MLD), and the MLE further comprises an MLD identifier (ID) field identifying the first MLD, and wherein the first AP is not affiliated with the first MLD, and the first MLD includes a second AP that is in a same basic service set identifier index (BSSID) set as the first AP; and sending the radio frame.

12. The first AP according to claim 11, wherein the radio frame further comprises a multiple BSSID element, the multiple BSSID element comprises index information of a BSSID of the second AP, and a value of the index information of the BSSID of the second AP is same as a value of the MLD ID field.

13. The first AP according to claim 12, wherein the MLE comprises a first per-STA profile element, the first per-STA profile element carries information of a third AP, and the third AP is affiliated with the first MLD; and when the first per-STA profile element does not comprise a first element of the third AP, a value of the first element of the third AP is same as a value of a first element of the second AP.

14. The first AP according to claim 13, wherein the MLE further comprises a first field, and a first value of the first field indicates that the value of the first element of the third AP is same as the value of the first element of the second AP.

15. The first AP according to claim 14, wherein the first field is located in a multi-link control field in the MLE; or the first field is located in a common information field in the MLE.

16. The first AP according to claim 12, wherein a value of a first element of the second AP is same as a value of a first element of the first AP.

17. The AP according to claim 11, wherein the first MLD comprises a fourth AP; and the radio frame further comprises a reduced neighbor report (RNR) element, the RNR element comprises information of the fourth AP and comprises first information identifying the first MLD, and a value of the first information is same as a value of the MLD ID field.

18. The AP according to claim 11, wherein the MLE comprises a common information field, and the MLD ID field is located in the common information field.

19. The AP according to claim 11, wherein the radio frame is a multi-link probe response frame.

20. An access point (AP) multi-link device (MLD), comprising the first AP according to claim 11.

* * * * *